US012742056B2

(12) United States Patent
Gutacker et al.

(10) Patent No.: US 12,742,056 B2
(45) Date of Patent: Sep. 22, 2026

(54) CURABLE POLYMER COMPOSITIONS COMPRISING HETEROATOM-CONTAINING SILANE COMPOUNDS

(71) Applicant: Henkel AG & Co. KGaA, Duesseldorf (DE)

(72) Inventors: Andrea Gutacker, Langenfeld (DE); Ligang Zhao, Duesseldorf (DE); Ralf Dunekake, Duesseldorf (DE); Kerstin Unger, Oberhausen (DE); Silvana Poelitz, Erkrath (DE); Sebastien Lanau, Duesseldorf (DE); Markus Bonigut, Hilden (DE); Niklas Schafhausen, Duesseldorf (DE); Esteban Mejia, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 18/798,973

(22) Filed: Aug. 9, 2024

(65) Prior Publication Data

US 2024/0400831 A1 Dec. 5, 2024

Related U.S. Application Data

(63) Continuation of application No. PCT/EP2023/054049, filed on Feb. 17, 2023.

(30) Foreign Application Priority Data

Feb. 18, 2022 (EP) .................................... 22157481

(51) Int. Cl.

| | |
|---|---|
| ***C08K 5/548*** | (2006.01) |
| ***C09D 183/06*** | (2006.01) |
| ***C09D 183/08*** | (2006.01) |
| ***C09J 183/06*** | (2006.01) |
| ***C09J 183/08*** | (2006.01) |
| *C08G 77/14* | (2006.01) |
| *C08G 77/22* | (2006.01) |

(52) U.S. Cl.

CPC ............ *C08K 5/548* (2013.01); *C09D 183/06* (2013.01); *C09D 183/08* (2013.01); *C09J 183/06* (2013.01); *C09J 183/08* (2013.01); *C08G 77/14* (2013.01); *C08G 77/22* (2013.01)

(58) Field of Classification Search

CPC .... C08G 5/5477; C08G 5/548; C08G 5/5435; C08L 83/04; C09D 183/04; C09J 183/04

See application file for complete search history.

(56) References Cited

U.S. PATENT DOCUMENTS

| | | | | |
|---|---|---|---|---|
| 2,640,814 | A | | 6/1953 | Schmutzler |
| 2,640,818 | A | * | 6/1953 | George .................. C08G 77/28 528/30 |
| 2,845,435 | A | * | 7/1958 | Frisch ....................... C07F 7/12 548/406 |
| 3,632,557 | A | | 1/1972 | George et al. |
| 3,971,751 | A | | 7/1976 | Katsuhiko et al. |
| 4,049,676 | A | | 9/1977 | Schilling |
| 4,625,012 | A | | 11/1986 | Sidky et al. |
| 5,648,427 | A | | 7/1997 | Fujita et al. |
| 6,355,127 | B1 | | 3/2002 | Syed et al. |
| 7,091,298 | B2 | | 8/2006 | Schindler et al. |
| 2022/0100092 | A1 | | 3/2022 | Shibayama et al. |

FOREIGN PATENT DOCUMENTS

| | | | | |
|---|---|---|---|---|
| AU | 2003231719 | A1 | * | 3/2004 |
| EP | 0520426 | A1 | | 12/1992 |
| EP | 0564253 | A1 | | 10/1993 |
| EP | 1414909 | B1 | | 10/2004 |
| EP | 3006486 | A1 | | 4/2016 |
| WO | 2009120434 | A1 | | 10/2009 |
| WO | 2020138189 | A1 | | 7/2020 |

OTHER PUBLICATIONS

International Search Report for International PCT Patent Application No. PCT/EP2023/054049—Mailing date: May 4, 2023.

* cited by examiner

*Primary Examiner* — Marc S Zimmer

(74) *Attorney, Agent, or Firm* — Mary K. Cameron

(57) ABSTRACT

The invention relates to compositions comprising a curable polymer and at least one silane compound having at least one hydrolysable group and at least one heteroatom bridged to a silicon atom via a $sp^2$-hybridized quaternary carbon atom, as defined herein, as well as adhesive, sealing, and coating material comprising the composition and the use of such compositions.

18 Claims, No Drawings

CURABLE POLYMER COMPOSITIONS COMPRISING HETEROATOM-CONTAINING SILANE COMPOUNDS

The invention relates to compositions comprising a curable polymer and at least one silane compound having at least one hydrolysable group and at least one heteroatom bridged to a silicon atom via a $sp^2$-hybridized quaternary carbon atom, as defined herein, and the use of such compositions.

EP 421129 A1 and EP 1414909 A1 disclose polymers terminated with silyl groups having alkoxy groups and an electronegative, free electron-pair-containing heteroatom bridged to a silicon through a methylene group and report that such silyl groups lead to faster curing, even at room temperature. These types of reagents are known in the art as alpha-silanes since the heteroatom is bound to a carbon atom in the position alpha to the silicon atom. The use of such alpha-silanes as cross-linking reagents in RTV formulations has been reported to have certain advantages since due to the high reactivity of alpha-silanes the amount of the catalyst can be decreased or no catalyst at all is needed. However, in many applications the high reactivity of common methylene-bridged alpha-silanes is undesired as time of processability is significantly shortened.

The present invention provides a novel class of silane compounds having at least one hydrolysable group and at least one heteroatom bridged to a silicon atom via a $sp^2$-hybridized quaternary carbon atom that have been found to be particularly useful as end-capping agent, water scavengers, crosslinkers and/or adhesion promoters in curable compositions. It has furthermore been found that these compounds can provide advantageous adhesive, curing or mechanical properties to compositions based on moisture-curable polymers, in particular those having silicone-containing terminal groups, such as silicones and silane-modified polymer (SMPs).

In accordance with a first aspect of the invention there is provided a curable composition comprising (A) at least one curable polymer;

(B) at least one silane compound of the general formula (I) containing at least one heteroatom bridged to a silicon atom via a $sp^2$-hybridized quaternary carbon atom (I)

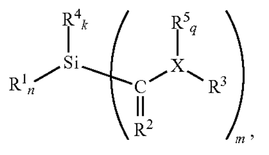

wherein each $R^1$ is independently selected from a hydrolysable group, preferably selected from the group consisting of alkoxy, carboxy, oxime, amino, amido, lactato, alkenoxy, and acetoxy groups, each $R^4$ is independently selected from hydrogen or a linear or branched, substituted or unsubstituted hydrocarbon group having 1 to 20 carbon atoms, preferably selected from $C_1$ to $C_{20}$ alkyl, $C_2$ to $C_{20}$ alkenyl, $C_5$ to $C_{20}$ aryl, $C_7$ to $C_{20}$ alkaryl, or $C_7$ to $C_{20}$ aralkyl groups, which may contain at least one heteroatom, preferably selected from O, N, S, P, Si, Cl, Br, I or F;

X is a divalent or polyvalent heteroatom, preferably selected from O, S, N or P;

each $R^5$ is independently selected from oxygen, hydrogen, or a linear or branched, substituted or unsubstituted hydrocarbon group having 1 to 20 carbon atoms, preferably selected from $C_1$ to $C_{20}$ alkyl, $C_4$ to $C_8$ cycloalkyl or $C_5$ to $C_{20}$ aryl groups, which may contain by at least one heteroatom, preferably selected from O, N, S, P, Si, Cl, Br, I or F;

$R^2$ is selected from a linear or branched, substituted or unsubstituted hydrocarbon group having 1 to 20 carbon atoms, preferably $C_1$ to $C_{20}$ alkyl, $C_2$ to $C_{20}$ alkenyl, $C_5$ to $C_{20}$ aryl, $C_7$ to $C_{20}$ alkaryl or $C_7$ to $C_{20}$ aralkyl groups, which may contain at least one heteroatom, preferably selected from O, N, S, P, Si, Cl, Br, I or F, $R^3$ is selected from hydrogen or a linear or branched, substituted or unsubstituted hydrocarbon group having 1 to 20 carbon atoms, preferably $C_1$ to $C_{20}$ alkyl, $C_2$ to $C_{20}$ alkenyl, $C_5$ to $C_{20}$ aryl, $C_7$ to $C_{20}$ alkaryl or $C_7$ to $C_{20}$ aralkyl groups, which may contain at least one heteroatom, preferably selected from O, N, S, P, Si, Cl, Br, I or F, or $R^2$ and $R^3$ may combine to form a cyclic structure, preferably a substituted or unsubstituted 5- to 10-membered (hetero)cyclic hydrocarbon structure containing the heteroatom X as part of the ring;

n is 1, 2 or 3, m is 1 or 2, k is 0 or 1, wherein the sum of n, m, and k is 4; and q is an integer selected from 0 to 3; and (C) optionally at least one curing catalyst.

In another aspect, the present invention is directed to the use of the curable compositions as an adhesive, sealing, or coating material.

As used herein, the singular forms "a", "an" and "the" include plural referents unless the context clearly dictates otherwise.

The terms "comprising" and "comprises" as used herein are synonymous with "including", "includes", "containing" or "contains", and are inclusive or open-ended and do not exclude additional, non-recited members, elements or method steps. "Consisting essentially of", as used herein, means that the respective composition is composed mainly, i.e. by at least 50% by weight, for example at least 60, 70 or 80%, of the listed components (A), (B) and optionally (C) and as well as optional other additives, such as fillers and/or plasticizers, as described below.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, room temperature is 23° C. plus or minus 2° C. "About", as sed herein in relation to a numerical value means said reference value±10%.

A "curable composition" is understood to be a substance or mixture of multiple substances, which is curable by physical or chemical measures. In this regard, these chemical or physical measures can be, for example, the supplying of energy in the form of heat, light, or other electromagnetic radiation, but also simply bringing into contact with atmospheric moisture, water, or a reactive component. The composition thereby changes from an original state to a state that has a higher hardness. In various embodiments, the curable compositions are moisture curable compositions. In such embodiments, the term "curable" may particularly relate to the property of (terminal) silane groups contained in the polymers to condensate.

The molecular weights given in the present text with reference to compounds of formula (I) refer to number average molecular weights (Mn), unless otherwise stipulated. All molecular weight data refer to values obtained by gel permeation chromatography (GPC) (for example according to DIN 55672-1:2007-08) carried out at 40° C. Tetrahydrofuran (THF) was used as an eluent. The sample was passed through three PSS SDV gel columns with molecular weight ranges of 102, 103 and 104 $g \cdot mol^{-1}$ with a flow rate of 0.9 $ml \cdot min^{-1}$. The calibration of the device was carried out using polystyrene standards. Molecular weights of monomeric compounds are calculated based on the respective molecular formula and the known molecular weights of the individual atoms.

As used herein, "polydispersity" refers to a measure of the distribution of molecular mass in a given polymer sample. The polydispersity is calculated by dividing the weight average molecular weight (Mw) by the number average molecular weight (Mn).

"At least one," as used herein, refers to 1 or more, i.e., 1, 2, 3, 4, 5, 6, 7, 8, 9, or more. In regard to an ingredient, the term relates to the type of ingredient and not to the absolute number of molecules. "At least one polymer" thus means, for example, at least one type of polymer, i.e., that a type of polymer or a mixture of a number of different polymers can be used. Together with weight data, the term refers to all compounds of the given type, contained in the composition/mixture, i.e., that the composition contains no other compounds of this type beyond the given amount of the relevant compounds.

All percentage data, provided in connection with the compositions described herein, refer to % by weight, based in each case on the relevant mixture, unless explicitly indicated otherwise.

"Alkyl," as used herein, refers to a saturated aliphatic hydrocarbon including straight-chain and branched-chain groups with up to 20, preferably up to 10 carbon atoms. "$C_1$ to $C_{20}$ alkyl" group refers to a monovalent group that contains 1 to 20 carbons atoms, that is a radical of an alkane and includes linear and branched organic groups. Examples of alkyl groups include but are not limited to: methyl; ethyl; propyl; isopropyl; n-butyl; isobutyl; sec-butyl; tert-butyl; n-pentyl; n-hexyl; n-heptyl; and 2-ethylhexyl. The alkyl groups can be substituted or unsubstituted. "Substituted," as used in this connection, means that one or more carbon atoms and/or hydrogen atom(s) of the alkyl group are replaced by heteroatoms or functional groups. Functional groups that can replace the hydrogen atoms are selected particularly from =O, =S, —OH, —SH, —$NH_2$, —$N(Alk)_2$, —$NO_2$, —CN, —F, —Cl, —Br, —I, —COOH, —$CONH_2$, —OCN, —NCO, $C_{3-8}$ cycloalkyl, amido, sulfonyl, sulfinyl, sulfanyl, sulfoxy, urea, thiourea, sulfamoyl, sulfamide, $C_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms are independently nitrogen, oxygen, or sulfur. "Alk", as used herein, means an unsubstituted $C_{1-10}$ alkyl group, preferably lower alkyl, i.e. $C_{1-4}$ alkyl, more preferably methyl or ethyl. Substituted alkyl includes, for example, alkylaryl and aminoalkyl groups, including N,N-dialkylaminoalkyl groups. The halogenated derivatives of the exemplary hydrocarbon radicals listed above may also be mentioned as examples of suitable substituted alkyl groups. Heteroalkyl groups in which 1 or more carbon atoms are replaced by heteroatoms, particularly selected from O, S, N, and Si, are obtained by the replacement of one or more carbon atoms by heteroatoms. Examples of such heteroalkyl groups are, without limitation, methoxymethyl, ethoxyethyl, propoxypropyl, methoxyethyl, isopentoxypropyl, ethylaminoethyl, trimethoxypropylsilyl, etc. In general, however, a preference for unsubstituted alkyl groups containing from 1 to 12 carbon atoms ($C_1$-$C_{12}$ alkyl)—for example unsubstituted alkyl groups containing from 1 to 4 carbon atoms ($C_1$-$C_4$ alkyl)—should be noted.

"Alkenyl," as used herein, refers to an alkyl group, as defined herein, which consists of at least two carbon atoms and comprises at least one carbon-carbon double bond. Said groups may comprise up to 20, preferably up to 10 carbon atoms. As used herein, the term "$C_2$ to $C_{20}$ alkenyl" group refers to an aliphatic hydrocarbon group which contains 2 to 20 carbon atoms and at least one carbon-carbon double bond, e.g., ethenyl, propenyl, butenyl, or pentenyl and structural isomers thereof such as 1- or 2-propenyl, 1-, 2-, or 3-butenyl, etc. Alkenyl groups can be linear or branched and substituted or unsubstituted. If they are substituted, the substituents are as defined above for alkyl. "Alkenyloxy" refers to an alkenyl group, as defined herein, that is linked via an —O— to the rest of the molecule. The respective term thus includes enoxy groups, such as vinyloxy ($H_2C$=CH—O—).

"Alkynyl," as used herein, refers to an alkyl group, as defined herein, which consists of at least two carbon atoms and comprises at least one carbon-carbon triple bond, e.g., ethynyl (acetylene), propynyl, butynyl, or pentynyl and structural isomers thereof as described above. Alkynyl groups can be substituted or unsubstituted. If they are substituted, the substituents are as defined above for alkyl. "Alkynyloxy" refers to an alkynyl group, as defined herein, that is linked via an —O— to the rest of the molecule.

"Acyl", as used herein, refers to an alkyl-C(=O)— group, with alkyl as defined herein above.

A "cycloaliphatic group" or "cycloalkyl group," as used herein, refers to monocyclic or polycyclic groups (a number of rings with carbon atoms in common), particularly of 3-8 carbon atoms, in which the ring does not have a completely conjugated pi-electron system, e.g., cyclopropyl, cyclobutyl, cyclopentyl, cyclohexyl, cyclobutenyl, cyclopentenyl, cyclohexenyl, etc. Cycloalkyl groups can be substituted or unsubstituted. "Substituted," as used in this regard, means that one or more hydrogen atoms of the cycloalkyl group are replaced by functional groups. Functional groups that can replace the hydrogen atoms are selected particularly from =O, =S, —OH, —SH, —$NH_2$, —$NO_2$, —CN, —F, —Cl, —Br, —I, —COOH, —$CONH_2$, —OCN, —NCO, $C_{1-10}$ alkyl, $C_{2-10}$ alkenyl, $C_{2-10}$ alkynyl, $C_{3-8}$ cycloalkyl, $C_{6-14}$ aryl, a 5-10-membered heteroaryl ring, in which 1 to 4 ring atoms independently are nitrogen, oxygen, or sulfur, and a 5-10-membered heteroalicyclic ring, in which 1 to 3 ring atoms independently are nitrogen, oxygen, or sulfur. "Cycloalkyloxy" refers to a cycloalkyl group, as defined herein, that is linked via an —O— to the rest of the molecule.

"Aryl," as used herein, refers to monocyclic or polycyclic groups (i.e., rings that have neighboring carbon atoms in common), for example having up to 20 or up to 14 carbon atoms. As used herein, the term "$C_5$ to $C_{20}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl, tetrahydronaphthyl, tetrahydroindenyl; tetrahydroanthracenyl; pyridinyl; and anthracenyl. Phenyl groups may be preferred in some embodiments. Aryl groups can be substituted or unsubstituted. If they are substituted, the substituents are as defined above for cycloalkyl. "Aryloxy" refers to an aryl group, as defined herein, that is linked via an —O— to the rest of the molecule.

As used herein, an "aralkyl" group refers to an alkyl group that is substituted with an aryl group. An example of an aralkyl group is benzyl.

Where mentioned, the expression "contain(s)/containing at least one heteroatom" means that the residue comprises at least one atom that differs from carbon atom and hydrogen. Preferably the term "heteroatom" refers to nitrogen, oxygen, silicon, sulfur, phosphorus, halogens such as Cl, Br, F. Sulfur (S), oxygen (O) and nitrogen (N) may be mentioned as typical heteroatoms in the context of the present invention.

As used herein, the "heterocyclic" compound refers to a saturated or unsaturated, monocyclic, bicyclic, polycyclic or fused compound containing at least one heteroatom, preferably O, S, N, and/or P, in the ring structure.

A "heteroaryl" group, as used herein, refers to a monocyclic or polycyclic (i.e., rings that share an adjacent ring atom pair) aromatic ring, having particularly 5 to 10 ring atoms, where one, two, three, or four ring atoms are nitrogen, oxygen, or sulfur and the rest is carbon. Examples of heteroaryl groups are pyridyl, pyrrolyl, furyl, thienyl, imidazolyl, oxazolyl, isoxazolyl, thiazolyl, isothiazolyl, pyrazolyl, 1,2,3-triazolyl, 1,2,4-triazolyl, 1,2,3-oxadiazolyl, 1,2,4-oxadiazolyl, 1,2,5-oxadiazolyl, 1,3,4-oxadiazolyl, 1,3,4-triazinyl, 1,2,3-triazinyl, benzofuryl, isobenzofuryl, benzothienyl, benzotriazolyl, isobenzothienyl, indolyl, isoindolyl, 3H-indolyl, benzimidazolyl, benzothiazolyl, benzoxazolyl, quinolizinyl, quinazolinyl, phthalazinyl, quinoxalinyl, cinnolinyl, naphthyridinyl, quinolyl, isoquinolyl, tetrazolyl, 5,6,7,8-tetrahydroquinolyl, 5,6,7,8-tetrahydroisoquinolyl, purinyl, pteridinyl, pyridinyl, pyrimidinyl, carbazolyl, xanthenyl, or benzoquinolyl. Heteroaryl groups can be substituted or unsubstituted. If they are substituted, the substituents are as defined above for cycloalkyl. "(Hetero) aryl", as used herein, refers to both aryl and heteroaryl groups as defined herein. "Heteroaryloxy" refers to a heteroaryl group, as defined herein, that is linked via an —O— to the rest of the molecule.

A "heteroalicyclic group" or a "heterocycloalkyl group," as used herein, refers to a monocyclic or fused ring having 5 to 10 ring atoms, which contains one, two, or three heteroatoms, selected from N, O, and S, whereby the rest of the ring atoms are carbon. A "heterocycloalkenyl" group contains in addition one or more double bonds. The ring however has no completely conjugated pi-electron system. Examples of heteroalicyclic groups are pyrrolidinone, piperidine, piperazine, morpholine, imidazolidine, tetrahydropyridazine, tetrahydrofuran, thiomorpholine, tetrahydropyridine, and the like. Heterocycloalkyl groups can be substituted or unsubstituted. If they are substituted, the substituents are as defined above for cycloalkyl. "Heteroalicycloxy" refers to a heteroalicyclic group, as defined herein, that is linked via an —O— to the rest of the molecule.

As used herein, the term "halogen" refers to fluorine, chlorine, bromine or iodine.

The curable compositions of the invention contain as component (A) at least one curable polymer. In various embodiments, said curable polymer may be selected from the group consisting of silane-modified polymers (SMPs) and silicones. In various embodiments, the curable polymer is a silicone. Preferred are silicone polymers that comprise or consist essentially of at least one polyorganosiloxane, such as polydimethylsiloxane.

In various embodiments, said polymers comprise at least one terminal group of formula (II)

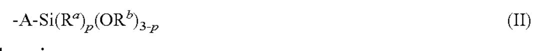

$$\text{-A-Si}(R^a)_p(OR^b)_{3-p} \quad \text{(II)}$$

wherein:

p is 0, 1 or 2;

A is a bond, —O— or a linear, branched or cyclic divalent group selected from hydrocarbon residues having 1 to 12 carbon atoms, alkylene, arylene, oxyalkylene, oxyarylene, siloxane-alkylene, siloxane-arylene, ester, amine, glycol, imide, amide, alcohol, carbonate, urethane, urea, sulfide, ether or a derivative or combination thereof;

each $R^a$ is independently selected from the group consisting of hydrogen, halogen, amino, oximino, a substituted or unsubstituted alkyl, alkenyl, alkenyloxy, alkynyl, alkynyloxy, cycloaliphatic, cycloaliphatic-O—, aryl, aryloxy, heteroaryl, heteroaryloxy, heteroalicyclic, heteroalicycloxy, acyl, acyloxy group or a combination thereof;

each $R^b$ is independently H, $C_1$-$C_8$ alkyl, $C_1$-$C_8$ acyl or a group of the general formula (IIIa) or (IIIb):

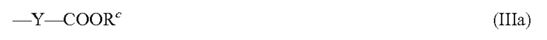

$$\text{—Y—COOR}^c \quad \text{(IIIa)}$$

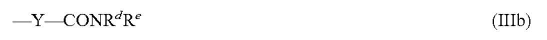

$$\text{—Y—CONR}^dR^e \quad \text{(IIIb)}$$

wherein

Y is a substituted or unsubstituted (hetero)aromatic group having 4 to 14 ring atoms, a substituted or unsubstituted saturated or partially unsaturated 4- to 14-membered (hetero)cyclic group or $—(C(R^f)_2)_s—$;

$R^c$ is a substituted or unsubstituted alkyl, alkenyl, alkynyl, cycloaliphatic, aryl, heteroaryl, and heteroalicyclic group or a combination thereof;

each $R^f$ is independently selected from the group consisting of hydrogen, a substituted or unsubstituted alkyl, alkenyl, alkynyl, cycloaliphatic or aryl group; and s is an integer from 1 to 10;

$R^d$ is selected from the group consisting of hydrogen, a substituted or unsubstituted alkyl, alkenyl, alkynyl cycloaliphatic, aryl, heteroaryl, and heteroalicyclic group or a combination thereof or $R^e$;

$R^e$ is a group of the general formula (IV):

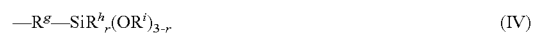

$$\text{—R}^g\text{—SiR}^h_r(OR^i)_{3-r} \quad \text{(IV)}$$

wherein $R^g$ is an alkylene group, optionally interrupted by a heteroatom;

each $R^h$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;

each $R^i$ is independently selected from the group consisting of a substituted or unsubstituted alkyl, alkenyl, alkynyl, or acyl group; and each r independently represents 0, 1, or 2.

Each $R^b$ may independently be selected from the group consisting of H and $C_1$ to $C_8$ alkyl and $C_1$ to $C_8$ acyl groups. In various embodiments, the hydrolyzable groups $OR^b$ are alkoxy groups, in particular methoxy, ethoxy, i-propyloxy or i-butyloxy groups. This is advantageous, since no substances which irritate mucous membranes are released during the curing of compositions comprising alkoxy groups. The alcohols formed by hydrolysis of the residues are harmless in the quantities released and evaporate. However, in other embodiments, an acyloxy group, such as an acetoxy group $—O—CO—CH_3$, can also be used as hydrolyzable group $OR^b$.

It is known that polyorganosiloxane endcapped with a silyl group having hydroxycarboxylic acid esters or to a lesser degree hydroxycarboxylic acid amides as leaving groups bound to the silicon atom assure that the curable composition has very high storage stability and cures reliably and at a sufficient rate after application in the presence of atmospheric moisture even at room temperature (23° C.).

According in various embodiments, the curable polymers include a polyorganosiloxane endcapped with silane groups of formula (II). Such polymers are obtainable by providing at least one polyorganosiloxane, which has at least one hydroxy group bound to a silicon atom. Preferably, the polyorganosiloxane has at least two hydroxy groups bound to a silicon atom. It is preferred, in addition, that the hydroxy group or hydroxy groups are bound to terminal silicon atoms. If the polyorganosiloxane is branched, it preferably has a hydroxy group at each end. Accordingly, while the invention covers polymers that have the silane group of formula (II) only on one end, it is preferred that all polymer chain ends are endcapped by said groups, i.e. a linear polymer would thus have two terminal silane groups. If the polymer is branched, it is preferred that each end is endcapped with the groups of formula (II). This applies to all polymers disclosed herein, not only the polyorganosiloxanes.

The polyorganosiloxane, which has at least one hydroxy group bound to a silicon atom, is preferably a polydiorganosiloxane, preferably a polydimethylsiloxane.

Preferably, therefore, an α,ω-dihydroxy-terminated polydiorganosiloxane, particularly an α,ω-dihydroxy-terminated polydimethylsiloxane is used as the polyorganosiloxane, which has at least one hydroxy group bound to a silicon atom. Particularly preferred are α,ω-dihydroxy-terminated polydimethylsiloxanes, which have a kinematic viscosity at 25° C. of 5000 to 120,000 cSt, particularly 10,000 to 100,000 cSt, and particularly preferably 50,000 to 90,000 cSt.

The polyorganosiloxanes may be linked to the terminal groups of formula (II) via a variety of different linking groups A. In various embodiments, A is a direct covalent bond, —O—, oxyalkylene, such as $—O—CH_2—$ or $—O—(CH_2)_3—$ or a linear or branched divalent group selected from siloxane-alkylene, preferably of the formula $—(CH_2)_{1-10}—(Si(Alk)_2\text{-}O—Si(Alk)_2)_{1-10}\text{-}(CH_2)_{1-10}$, or a derivative thereof, with Alk being unsubstituted $C_{1-10}$ alkyl, preferably methyl. If A is a siloxane-alkylene of the formula $—(CH_2)_{1-10}—(Si(Alk)_2\text{-}O—Si(Alk)_2)_{1-10}\text{-}(CH_2)_{1-10}$, it is preferably selected from $—(CH_2)_2—Si(CH_3)_2—O—Si(CH_3)_2—(CH_2)_2—$.

Alternatively, in various embodiments, the polyorganosiloxanes may be linked to the terminal groups of formula (II) via a moiety selected from —O—C(=O)—NH—, —NH—C(=O)O—, —NH—C(=O)—NH—, —NR'C(=O)—NH—, —NH—C(=O)—NR'—, —NH—C(=O), —C(=O)—NH—, —C(=O)—O—, —O—C(—O)—, —O—C(=O)—O—, —S—C(=O)—NH—, —NH—C(=O)—S—, —C(=O)—S—, —S—C(=O)—, —S—C(=O)—S—, —C(=O)—, —S—, —O— and —NR', wherein R' can be hydrogen or a hydrocarbon moiety with 1 to 6 carbon atoms, optionally substituted with halogen, preferably $C_1$-$C_2$ alkyl or hydrogen. In such embodiments, A may consist of the afore-mentioned groups optionally further connected to a bivalent alkylene group having 1 to 10 carbon atoms, optionally interrupted by a heteroatom, that may be substituted, preferably $—CH_2—$ or $—(CH_2)_3—$. If such alkylene group is present, the orientation is such that the alkylene group connects to the silicon atom of the terminal group of formula (II) while the above-listed functional groups connect to a terminal silicon atom of the polymer chain, i.e. the full linker -A- could be $—O—C(=O)—NH—C_{1-10}$ alkylene- or $—O—C_{1-10}$ alkylene-.

To obtain a polymer (A), said polymers may be reacted with a suitable silane crosslinker that yields the desired polymer (A). Generally, said crosslinkers are silanes of the formula:

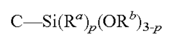

$C—Si(R^a)_p(OR^b)_{3-p}$ with C being the reactive group that reacts with the terminal group of the polymer, typically —OH or amino or isocyanate, to yield the linking group -A-.

Suitable reactions are known and are also called endcapping. These can be carried out optionally in the presence of a catalyst, whereby the catalyst is to mediate the endcapping selectively without simultaneously curing the polyorganosiloxane. Suitable catalysts are, for example, acids, organic lithium compounds, as they are described, for example, in EP 0 564 253 A1, amines, inorganic oxides, potassium acetate, organotitanium derivatives, titanium/amine combinations, and carboxylic acid/amine combinations.

In the group of formula (II), each $R^a$ independently stands for a substituted or unsubstituted alkyl, alkenyl, or alkynyl group; a substituted or unsubstituted cycloaliphatic group or aryl group; or a substituted or unsubstituted heteroalicyclic group or heteroaryl group. Alternatively, or additionally, one or more $R^a$ may represent hydrogen, halogen, amino, oximino, alkenyloxy, alkynyloxy, cycloaliphatic-O—, aryloxy, heteroaryloxy, heteroalicycloxy, acyl, acyloxy or a combination thereof.

In various embodiments, each $R^a$ independently of one another stands for an alkyl group having 1 to 10 carbon atoms, particularly methyl, ethyl, propyl, or isopropyl, for an alkenyl group having 2 to 10 carbon atoms, particularly vinyl or allyl, or an aryl group having 6 to 10 carbon atoms, particularly phenyl, or an aryloxy group having 6 to 14 carbon atoms, or an acyloxy group having 2 to 10 carbon atoms, preferably acetoxy, oximino, alkenyloxy having 2 to 10 carbon atoms, or amino.

In specific embodiments, each $R^a$ independently represents methyl, vinyl, or phenyl, particularly preferred are methyl and vinyl.

In formula (II), each $R^b$ is independently as defined above, i.e. is H, $C_1$-$C_8$ alkyl, $C_1$-$C_8$ acyl including the preferred embodiments thereof, or is a group of the general formula (IIIa) or (IIIb):

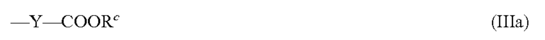

$—Y—COOR^c$ (IIIa)

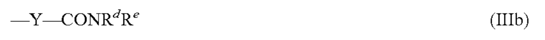

$—Y—CONR^dR^e$ (IIIb)

wherein

Y is a substituted or unsubstituted (hetero)aromatic group having 4 to 14 ring atoms, a substituted or unsubstituted saturated or partially unsaturated 4- to 14-membered (hetero)cyclic group or $—(C(R^f)_2)_s—$;

$R^c$ is a substituted or unsubstituted alkyl, alkenyl, alkynyl, cycloaliphatic, aryl, heteroaryl, and heteroalicyclic group or a combination thereof;

each $R^f$ is independently selected from the group consisting of hydrogen, a substituted or unsubstituted alkyl, alkenyl, alkynyl, cycloaliphatic or aryl group; and s is an integer from 1 to 10, preferably 1 to 5, more preferably 1 or 2.

$R^d$ is selected from the group consisting of hydrogen, a substituted or unsubstituted alkyl, alkenyl, alkynyl cycloaliphatic, aryl, heteroaryl, and heteroalicyclic group or a combination thereof or $R^e$;

$R^e$ is a group of the general formula (IV):

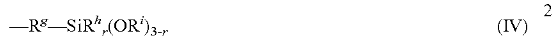

$$—R^g—SiR^h_r(OR^i)_{3-r} \quad (IV)$$

wherein $R^g$ is an is an alkylene group, optionally interrupted by a heteroatom, such as O, N, S or Si, preferably a $C_{1-10}$ or $C_1$-8 alkylene group, more preferably a $C_1$-$C_3$ alkylene group, most preferably a methylene ($CH_2$) or propylene ($(CH_2)_3$) group;

each $R^h$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof;

each $R^i$ is independently selected from the group consisting of a substituted or unsubstituted alkyl, alkenyl, alkynyl, or acyl group, preferably unsubstituted lower alkyl, more preferably methyl or ethyl; and each r independently stands for 0, 1, or 2, preferably 0 or 1, more preferably 0.

In various embodiments of formula (IIIa), $R^c$ stands for a substituted or unsubstituted alkyl group having 1 to 10 carbon atoms, particularly having 1 to 4 carbon atoms, particularly preferably methyl or ethyl. In some embodiments, Y is a substituted or unsubstituted aromatic group having 6 carbon ring atoms, preferably 1,2-phenylene, or $—(C(R^f)_2)_s—$, wherein s is 1 and one of the $R^f$ groups is hydrogen and the second $R^f$ group is a substituted or unsubstituted alkyl group having 1 to 10 carbon atoms, particularly methyl, carboxymethyl or an (alkyl) ester thereof, such as ethylcarboxymethyl. In various such embodiments, each $OR^b$ independently of one another stands for a lactic acid ester, preferably the ethyl ester, or a malic acid mono- or diester, preferably the mono- or diethyl ester.

In other embodiments, each $OR^b$ is derived from salicylic acid, i.e. Y is 1,2-phenylene. The salicylic acid residue is an ester, for example the methyl or ethyl ester, preferably the ethyl ester.

In various embodiments of formula (IIIb) Y is as defined for the group of formula (IIIa) above, i.e. Y is a substituted or unsubstituted aromatic group having 6 carbon ring atoms, preferably 1,2-phenylene, or $—(C(R^f)_2)_s—$, wherein s is 1 and one of the $R^f$ groups is hydrogen and the second $R^f$ group is a substituted or unsubstituted alkyl group having 1 to 10 carbon atoms, particularly methyl, carboxymethyl or an (alkyl) ester thereof, such as ethylcarboxymethyl.

In various embodiments, $R^d$ preferably stands for hydrogen, a substituted or unsubstituted alkyl group having 1 to 10 carbon atoms, preferably an unsubstituted alkyl group having 1 to 10 carbon atoms, more preferably having 1 to 6 carbon atoms, even more preferably unsubstituted alkyl having 1 to 4 carbon atoms or hydrogen.

In various embodiments, $R^g$ preferably is an alkylene group of the formula $—(CH_2)_{1-8}—$, more preferably $—(CH_2)_{1-5}—$, even more preferably $—(CH_2)_{1-3}—$, most preferably $—CH_2—$ or $—(CH_2)_3—$.

In various embodiments, each $R^h$ independently of one another preferably stands for a substituted or unsubstituted alkyl group having 1 to 10 carbon atoms, preferably an unsubstituted alkyl group having 1 to 10 carbon atoms, particularly having 1 to 4 carbon atoms, particularly preferably methyl or ethyl.

In various embodiments, each $R^i$ independently of one another preferably stands for a substituted or unsubstituted alkyl group having 1 to 10 carbon atoms, preferably an unsubstituted alkyl group having 1 to 10 carbon atoms, particularly having 1 to 4 carbon atoms, particularly preferably methyl or ethyl, most preferably methyl.

In various embodiments of groups of the formula (IIIb), Y is a substituted or unsubstituted aromatic group having 6 carbon ring atoms, preferably 1,2-phenylene, or $—C(R^f)_2)_s—$, wherein s is 1 and one of the $R^f$ groups is hydrogen and the second $R^f$ group is a substituted or unsubstituted alkyl group having 1 to 10 carbon atoms, particularly methyl, carboxymethyl or an (alkyl) ester thereof, $R^d$ represents hydrogen, a substituted or unsubstituted alkyl group having 1 to 10 carbon atoms, particularly having 1 to 4 carbon atoms, and $R^e$ represents a group of the formula (IV), where $R^g$ is a $C_{1-10}$ alkylene group, preferably a $C_1$ or $C_3$ alkylene group, each $R^h$ independently of one another stands for a substituted or unsubstituted alkyl group having 1 to 10 carbon atoms, particularly having 1 to 4 carbon atoms, particularly preferably methyl or ethyl, and each $R^i$ independently of one another stands for a substituted or unsubstituted alkyl group having 1 to 10 carbon atoms, particularly having 1 to 4 carbon atoms, particularly preferably methyl or ethyl; and p is 0 or 1, preferably 0.

In various embodiments, the terminal groups of formula (II) contain no groups of formula (IIIb), i.e., no hydroxycarboxylic acid amide groups. Exemplary groups of formula (II) in this case may be selected from methyl bis(ethyl lactato)silane, ethyl bis(ethyl lactato)silane, phenyl bis(ethyl lactato)silane, vinyl bis(ethyl lactato)silane, tri(ethyl lactato) silane, methyl bis(ethyl salicylato)silane, ethyl bis(ethyl salicylato)silane, phenyl bis(ethyl salicylato)silane, vinyl bis(ethyl salicylato)silane, tri(ethyl salicylato)silane, methyl bis(diethyl malato)silane, ethyl bis(diethyl malato)silane, phenyl bis(diethyl malato)silane, vinyl bis(diethyl malato) silane, tri(diethyl malato)silane and mixtures thereof.

In various other embodiments, the terminal groups of formula (II) contain at least one group of formula (IIIb), i.e., at least one hydroxycarboxylic acid amide group. Preferred groups of formula (II) in this case are selected from compounds, which are obtained by the selective amidation of methyl bis(ethyl lactato)silane, ethyl bis(ethyl lactato)silane, phenyl bis(ethyl lactato)silane, vinyl bis(ethyl lactato)silane, tri(ethyl lactato)silane, methyl bis(ethyl salicylato)silane, ethyl bis(ethyl salicylato)silane, phenyl bis(ethyl salicylato) silane, vinyl bis(ethyl salicylato)silane, tri(ethyl salicylato) silane, methyl bis(diethyl malato)silane, ethyl bis(diethyl malato)silane, phenyl bis(diethyl malato)silane, vinyl bis (diethyl malato)silane, tri(diethyl malato)silane, and mixtures thereof with an amine of the formula (V):

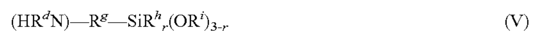

$$(HR^dN)—R^g—SiR^h_r(OR^i)_{3-r} \quad (V)$$

where r, $R^d$, $R^g$, $R^h$ and $R^i$, in each case independently of one another, have the aforesaid general, preferred, and particularly preferred meanings. Particularly preferably, this concerns an amidation product of methyl bis(ethyl lactato)silane, ethyl bis(ethyl lactato)silane, phenyl bis(ethyl lactato)silane, vinyl bis(ethyl lactato) silane, tri(ethyl lactato)silane, methyl bis(ethyl salicylato)silane, ethyl bis(ethyl salicylato)silane, phenyl bis (ethyl salicylato)silane, vinyl bis(ethyl salicylato) silane, tri(ethyl salicylato)silane, methyl bis(diethyl malato)silane, ethyl bis(diethyl malato)silane, phenyl bis(diethyl malato)silane, vinyl bis(diethyl malato)silane, tri(diethyl malato)silane, and mixtures thereof with 3-aminopropyltrimethoxysilane and/or 3-aminopropyltriethoxysilane.

In various embodiments, the terminal groups of formula (II) of the polymer (A), only comprise $OR^b$ groups of formula (IIIa), and optionally (IIIb). It may be preferred that not all $OR^b$ groups are those of formula (IIIb) and that, for example, at least one $OR^b$ group of formula (IIIa) is present in each terminal group of formula (II).

In various other embodiments, all $OR^b$ groups are not of formula (IIIa) or (IIIb) and are preferably selected from alkoxy and acyloxy groups, as defined above, preferably alkoxy groups.

In various embodiments of the invention, the curable polymer may be a silane-modified polymer. Silane-modified polymers (SMPs) include polymers that have terminal silane groups. The terminal silane groups can be those of formula (II) defined above and are preferably groups as described above for the silicones. In various embodiments of the SMPs, in the terminal groups of formula (II) all $OR^b$ groups are not of formula (IIIa) or (IIIb) and are preferably selected from alkoxy and acyloxy groups, as defined above, preferably alkoxy groups.

SMPs generally are comprised of flexible polymeric backbones that are terminated by moisture reactive (hydrolyzable) silane terminal groups. SMPs, generally, have been made by three routes. The first, illustrated by U.S. Pat. No. 3,971,751, involves hydrosilylating a silicon hydride having hydrolyzable silyl groups with an allyl terminated polyether, where the allyl terminated polyether was formed from a polyether polyol. The second, illustrated by U.S. Pat. No. 3,632,557, generally involves reacting an aminosilane with an isocyanate terminated prepolymer resulting in trialkoxysilyl end groups with polyether polymer backbones containing urea linkages. The third, illustrated by U.S. Pat. Nos. 4,625,012 and 6,355,127 involves reacting an isocyanato organosilane with a polyurethane having terminal active hydrogens.

In various embodiments, the terminal silane groups of the SMPs may alternatively be of formula (IV), as defined above, i.e., have the formula $—R^g—SiR^h_r(OR^i)_{3-r}$, wherein $R^g$ is an alkylene group, optionally interrupted by a heteroatom, such as O, N, S or Si; each $R^h$ is independently selected from the group consisting of hydrogen, halogen, amino, a substituted or unsubstituted alkyl, alkenyl, alkynyl, cycloaliphatic, aryl, heteroaryl, and heteroalicyclic group or a combination thereof; and each $R^i$ is independently selected from the group consisting of a substituted or unsubstituted alkyl, alkenyl, alkynyl, or acyl group. Additionally, in one embodiment $R^g$ may be absent so that the silicon atom is directly bonded to the polymer. Suitable chemistries for linking the silane group to the polymer backbone have been described by reference above and may be further adapted by those skilled in the art.

The polymer backbone may be any type of polymer suitable for this purpose and includes polyurethanes, polyethers, polyesters, and polycarbonates. Commercially available SMPs include those available from Dow under the tradename Vorasil® and from Evonik under the tradenames Polymer ST and Tegopac®.

In preferred embodiments, the curable polymer(s), for example alkoxy- and/or acyloxy- and/or lactic acid estersilane-terminated polymer(s), has/have at least two terminal groups of the general formula (II). Each polymer chain thus comprises at least two linking points at which the condensation of the polymers can be completed, splitting off the hydrolyzed residues in the presence of atmospheric moisture. In this way, regular and rapid crosslinkability is achieved so that bonds with good strengths can be obtained. In addition, by means of the quantity and the structure of the hydrolyzable groups—for example by using di- or trialkoxysilyl groups, methoxy groups or longer residues—the configuration of the network that can be achieved as a long-chain system (thermoplastics), relatively wide-mesh three-dimensional network (elastomers) or highly crosslinked system (thermosets) can be controlled, so that inter alia the elasticity, flexibility and heat resistance of the finished crosslinked compositions can be influenced in this way.

In some embodiments, in the general formula (II), p is 0 or 1 and $R^a$ is preferably an alkyl group, such as methyl, and each $OR^b$ is independently an alkoxy group, preferably methoxy or ethoxy. In general, polymers comprising di- or trialkoxysilyl groups have highly reactive linking points which permit rapid curing, high degrees of crosslinking and thus good final strengths. The particular advantage of dialkoxysilyl groups lies in the fact that, after curing, the corresponding compositions are more elastic, softer and more flexible than systems comprising trialkoxysilyl groups.

With trialkoxysilyl groups, on the other hand, a higher degree of crosslinking can be achieved, which is particularly advantageous if a harder, stronger material is desired after curing. In addition, trialkoxysilyl groups are more reactive and therefore crosslink more rapidly, thus reducing the quantity of catalyst required, and they have advantages in "cold flow"—the dimensional stability of a corresponding adhesive under the influence of force and possibly temperature.

Methoxy and ethoxy groups as comparatively small hydrolyzable groups with low steric bulk are very reactive and thus permit a rapid cure, even with low use of catalyst. They are therefore of particular interest for systems in which rapid curing is desirable. In addition to methoxy and ethoxy groups, it is of course also possible to use larger residues as hydrolyzable groups, which by nature exhibit lower reactivity. This is of particular interest if delayed curing is also to be achieved by means of the configuration of the alkoxy groups.

In various embodiments, the curable compositions contain the curable polymer (A) in an amount of 32 to 97% by weight, particularly preferably in an amount of 40 to 70% by weight, based in each case on the total weight of components (A), (B) and (C) or the total weight of the composition if additional components, as described below, are present. If fillers are included in substantial amounts, the amount of polymer (A) may be lower than 32% by weight, for example. If a mixture of polymers, for example a mixture of polyorganosiloxanes, is used, the amounts relate to the total amount of polymers in the composition.

The silane of the general formula (I)—used as component (B)—preferably is a heterocycle-containing silane of the general formula (I-A)

(I-A)

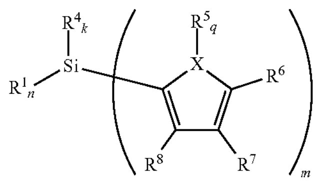

wherein $R^1$, $R^4$, $R^5$, X, n, m, k, and q are as defined above;

$R^6$, $R^7$ and $R^8$ are same or different, independently from one another, selected from hydrogen, a hydroxy group, or a linear or branched, substituted or unsubstituted hydrocarbon group having 1 to 20 carbon atoms, preferably selected from $C_1$ to $C_{20}$ alkyl, $C_4$ to $C_8$ cycloalkyl or $C_5$ to $C_{20}$ aryl groups, which may contain at least one heteroatom, preferably selected from O, N, S or Si.

The silane compound of the general formula (I) or (I-A) has at least one, preferably at least two hydrolyzable groups $R^1$. In preferred embodiments, each $R^1$ is independently selected from the group consisting of alkoxy, carboxy, oxime, amino, amido, lactato, alkenoxy, and acetoxy groups. More preferably, each $R^1$ is independently selected from alkoxy groups, in particular is a methoxy or ethoxy group. In some embodiments, a methoxy group may be preferable over an ethoxy group and some other embodiments it may be vice versa.

In preferred embodiments, each $R^4$ is independently selected from hydrogen, or $C_1$ to $C_{20}$ alkyl, $C_2$ to $C_{20}$ alkenyl, $C_5$ to $C_{20}$ aryl, $C_7$ to $C_{20}$ alkaryl, or $C_7$ to $C_{20}$ aralkyl groups which may contain at least one heteroatom, preferably selected from O, N, S, P, Si, Cl, Br, I or F.

In more preferred embodiments, $R^4$ is selected from hydrogen, or $C_1$ to $C_{12}$ alkyl, $C_2$ to $C_{12}$ alkenyl, $C_5$ to $C_{12}$ aryl, $C_7$ to $C_{13}$ alkaryl, or $C_7$ to $C_{13}$ aralkyl groups which may contain at least one heteroatom, more preferably selected from hydrogen, or $C_1$ to $C_{12}$ alkyl, $C_2$ to $C_{12}$ alkenyl, or $C_5$ to $C_{12}$ aryl groups which may contain at least one heteroatom, preferably selected from O, N, S, P, Si, Cl, Br, I or F.

In certain embodiments, $R^4$ is selected from hydrogen, or $C_2$ to $C_{12}$ alkyl, $C_2$ to $C_{12}$ alkenyl, or $C_5$ to $C_{12}$ aryl groups which may contain at least one heteroatom, preferably selected from $C_2$ to $C_{12}$ alkenyl or $C_5$ to $C_{12}$ aryl groups which may contain at least one heteroatom, more preferably selected from ethyl, n-propyl, isopropyl, trifluoropropyl, aminopropyl, n-butyl, sec-butyl, tert-butyl, vinyl, phenyl, or pyridinyl group.

In certain embodiments, $R^4$ can contain vinyl, amino, acrylate or hydroxy functionalities.

In certain embodiments, $R^4$ can be selected from hydrogen, ethyl, phenyl, tolyl, benzoyl, vinyl, pyridinyl or aminoalkyl, such as aminopropyl. More preferably, $R^4$ can be selected from phenyl, vinyl, or aminopropyl. In some embodiments, $R^4$ is vinyl.

In preferred embodiments, X is selected from O, S, N or P, more preferably O or S, most preferably X is S.

In preferred embodiments, each $R^5$ is independently selected from oxygen, hydrogen, or linear or branched, substituted or unsubstituted $C_1$ to $C_{20}$ alkyl, $C_4$ to $C_8$ cycloalkyl, or $C_5$ to $C_{20}$ aryl groups which may contain at least one heteroatom, preferably selected from O, N, S, P, Si, Cl, Br, I or F.

In preferred embodiments, $R^2$ is selected from a linear or branched, substituted or unsubstituted $C_1$ to $C_{20}$ alkyl, $C_2$ to $C_{20}$ alkenyl, $C_5$ to $C_{20}$ aryl, $C_7$ to $C_{20}$ alkaryl or $C_7$ to $C_{20}$ aralkyl groups, which may contain at least one heteroatom, preferably selected from O, N, S, P, Si, Cl, Br, I or F; and $R^3$ is selected from hydrogen or a linear or branched, substituted or unsubstituted $C_1$ to $C_{20}$ alkyl, $C_2$ to $C_{20}$ alkenyl, $C_5$ to $C_{20}$ aryl, $C_7$ to $C_{20}$ alkaryl or $C_7$ to $C_{20}$ aralkyl groups, which may contain at least one heteroatom, preferably selected from O, N, S, P, Si, Cl, Br, I or F. In other preferred embodiments, $R^2$ and $R^3$ may form a cyclic structure, preferably a substituted or unsubstituted 5- to 10-membered cyclic hydrocarbon structure containing the heteroatom X as part of the ring, wherein X is preferably selected from O, S, N or P, more preferably O or S, most preferably is S.

In the general formula (I) or (I-A), n is 1, 2 or 3, preferably 2 or 3, m is 1 or 2, preferably 1, k is 0 or 1, wherein the sum of n, m, and k is 4. Preferably, m is 1 and n+k=3.

In the general formula (I-A), $R^6$, $R^7$ and $R^8$ are same or different, independently from one another, selected from hydrogen, a hydroxy group, or a linear or branched, substituted or unsubstituted hydrocarbon group having 1 to 20 carbon atoms, preferably selected from $C_1$ to $C_{20}$ alkyl, $C_4$ to $C_8$ cycloalkyl or $C_5$ to $C_{20}$ aryl groups which may contain at least one heteroatom, preferably selected from O, N, S or Si. In various embodiments, $R^6$, $R^7$ and $R^8$ are hydrogen.

In various embodiments of the compounds of general formula (I-A) m is 1 and n is 2 or 3 (such that k is thus 0 or 1). In such embodiments X is preferably S and q is 0. In such embodiments, $R^6$, $R^7$ and $R^8$ are preferably hydrogen. In such embodiments, $R^4$ may preferably be vinyl and all $R^1$ may preferably be methoxy or all may be ethoxy.

Compounds of (I-A) wherein m is 1, n is 2 and k is 1, X is S, q is 0, $R^6$, $R^7$ and $R^8$ are hydrogen, $R^4$ is vinyl and all $R^1$ are methoxy or ethoxy; or m is 1 and n is 3 and k is 0, X is S, q is 0, $R^6$, $R^7$ and $R^8$ are hydrogen, and all $R^1$ are either methoxy or all are ethoxy are particularly preferred.

The silane compounds (B) having the structure of formula (I) or (I-A) are typically contained in the curable compositions in amounts of up to 30% by weight, preferably up to 20, 18, 16, 14, 12, or up to 10% by weight. Lower limits can range from 0.1 to 2% by weight, for example at least 0.5, at least 1 or at least 1.5% by weight. These amounts are based in each case on the total weight of components (A), (B) and (C), or the total weight of the composition if additional components, as described below, are present. If substantial amounts of components other than (A), (B) and (C) are comprised in the compositions, the amount of (B) may be lower than 0.1% by weight, for example, but preferably, also in these embodiments, the amount is at least 0.1 or at least 0.5 wt.-% relative to the total weight of the composition.

The silane compounds of the general formula (I) may be synthesized as follows:

a) contacting at least one metal with an organic solvent, wherein the metal is selected from the group consisting of Mg, Na, Li, Ca, Ba, Cd, and Zn, or mixtures or alloys thereof, b) adding at least one silane of the general formula (VI) to the organic solvent

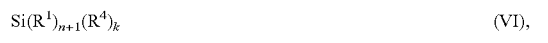

$$Si(R^1)_{n+1}(R^4)_k \quad (VI),$$

wherein $R^1$ and $R^4$, n, and k are as defined above, and c) adding at least one halogenated compound of the general formula (VII) to the reaction medium obtained in the step b)

(VII)

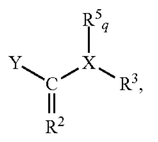

wherein $R^2$, $R^3$, and $R^5$, and q are as defined above; and Y is a halogen atom.

The halogenated compound having the general formula (VII-A) may be used in the step c) to obtain the silane of the general formula (I-A) as defined herein (VII-A)

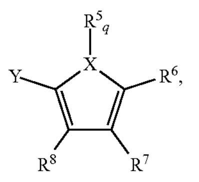

wherein $R^5$ to $R^8$, X and q are as defined above; and Y is a halogen atom.

In the general formula (VII) or (VII-A), Y is preferably selected from Cl, Br, or I, more preferably Br.

The metal in step a) is selected from the group consisting of Mg, Na, Li, Ca, Ba, Cd, and Zn, or mixtures or alloys thereof. In preferred embodiments, the metal is Mg.

The addition of the at least one halogenated compound of the general formula (VII) or (VII-A) (step c)) may be conducted after the steps a) and b). This results in the in situ generation of an organometallic species which directly reacts with the organosilane to the desired product.

In some embodiments, the at least one halogenated compound of the general formula (VII) or (VII-A) is added in step c) while maintaining the temperature at a temperature lower than or equal to the boiling point of the organic solvent, more preferably at a temperature lower than the boiling point of the organic solvent. The halogenated compound of the general formula (VII) or (VII-A) can be added dropwise. A reduction in reaction temperature has been found to influence the yield. The reduced temperature suppresses initial side reactions, boosting the overall yield.

In various embodiments, the organic solvent is selected from cyclic ethers, or dialkyl ethers, or aryl ethers, preferably dioxane, tetrahydrofuran, 2-methyl-tetrahydrofuran, diethyl ether or cyclopentyl methyl ether, most preferably is tetrahydrofuran.

In various embodiments, the organic solvent is tetrahydrofuran and the halogenated compound of the general formula (VII) or (VII-A) is added in step c) while maintaining the temperature at a temperature between 40° C. and 66° C., preferably between 40° C. and 60° C., more preferably between 40° C. and 50° C.

In various embodiments, the process further comprises the step d): removing the organic solvent after the reaction in the step c), preferably by distillation under inert conditions and under reduced pressure and/or at increased temperature, and then adding a second organic solvent which is different from the removed solvent (hereinafter, also referred to as "first organic solvent"). The remaining halogenated compounds can be removed during the removal alongside the first organic solvent. Switching solvents during the procedure ensures substantially full precipitation of the obtained crude product, that contains desired product and starting silane material and only traces of remaining solvent.

In various embodiments, the second organic solvent, which is different from the first organic solvent, is selected from $C_{4-20}$ hydrocarbons with a dielectric constant (at 20° C.) lower than 3, preferably selected from alkanes or arenes, more preferably selected from n-pentane, n-hexane, n-heptane, cyclohexane, benzene, toluene or xylene, most preferably is an n-hexane.

In various embodiments, the molar ratio of the silane of the general formula (VI) added in the step b) and the halogenated compound of the general formula (VII) or (VII-A) added in the step c) is from 1:5 to 5:1, preferably from 1:1 to 2:1.

The curable compositions optionally comprise as component (C) at least one curing catalyst.

In various embodiments, the curing catalyst may be a tin compound, preferably an organotin compound or an inorganic tin salt. Tin in these tin compounds is preferably bivalent or tetravalent. Component (C) is added to the composition particularly as a crosslinking catalyst. Suitable inorganic tin salts are, for example, tin(II) chloride and tin(IV) chloride. Organotin compounds (tin organyles) are used preferably as the tin compounds, however. Suitable organotin compounds are, for example, the 1,3-dicarbonyl compounds of bivalent or tetravalent tin, for example, the acetylacetonates such as di(n-butyl)tin(IV) di(acetylacetonate), di(n-octyl)tin(IV) di(acetylacetonate), (n-octyl)(n-butyl)tin(IV) di(acetylacetonate); the dialkyl tin(IV) dicarboxylates, for example, di-n-butyltin dilaurate, di-n-butyltin maleate, di-n-butyltin diacetate, di-n-octyltin dilaurate, di-n-octyltin diacetate, or the corresponding dialkoxylates, for example, di-n-butyltin dimethoxide; oxides of tetravalent tin, for example, dialkyltin oxides, such as, for example, di-n-butyltin oxide and di-n-octyltin oxide; and the tin(II) carboxylates such as tin(II) octoate or tin(II) phenolate.

Suitable furthermore are tin compounds of ethyl silicate, dimethyl maleate, diethyl maleate, dioctyl maleate, dimethyl phthalate, diethyl phthalate, dioctyl phthalate, such as, for example, di(n-butyl)tin(IV) di(methyl maleate), di(n-butyl)tin(IV) di(butyl maleate), di(n-octyl)tin(IV) di(methyl maleate), di(n-octyl)tin(IV) di(butyl maleate), di(n-octyl)tin(IV) di(isooctyl maleate); and di(n-butyl)tin(IV) sulfide, $(n\text{-butyl})_2Sn(SCH_2COO)$, $(n\text{-octyl})_2Sn(SCH_2COO)$, $(n\text{-octyl})_2Sn(SCH_2CH_2COO)$, $(n\text{-octyl})_2Sn(SCH_2CH_2COOCH_2CH_2OCOCH_2S)$, $(n\text{-butyl})_2\text{-}Sn(SCH_2COO\text{-}i\text{-}C_8H_{17})_2$, $(n\text{-octyl})_2Sn(SCH_2COO\text{-}i\text{-}C_8H_{17})_2$, and $(n\text{-octyl})_2Sn(SCH_2COO\text{-}n\text{-}C_8H_{17})_2$.

Preferably, the tin compound is selected from 1,3-dicarbonyl compounds of bivalent or tetravalent tin, the dialkyltin(IV) dicarboxylates, the dialkyltin(IV) dialkoxylates, the dialkyltin(IV) oxides, the tin(II) carboxylates, and mixtures thereof.

Particularly preferably, the tin compound is a dialkyltin(IV) dicarboxylate, particularly di-n-butyltin dilaurate or di-n-octyltin dilaurate.

Additionally or alternatively, other metal-based condensation catalysts may be used, including, without limitation, compounds of titanium such as organotitanates or chelate complexes, cerium compounds, zirconium compounds, molybdenum compounds, manganese compounds, copper compounds, aluminum compounds, or zinc compounds or their salts, alkoxylates, chelate complexes, or catalytically active compounds of the main groups or salts of bismuth, lithium, strontium, or boron.

Further suitable (tin-free) curing catalysts are, for example, organometallic compounds of iron, particularly the 1,3-dicarbonyl compounds of iron such as, e.g., iron(III) acetylacetonate.

Boron halides such as boron trifluoride, boron trichloride, boron tribromide, boron triiodide, or mixtures of boron halides can also be used as curing catalysts. Particularly preferred are boron trifluoride complexes such as, e.g., boron trifluoride diethyl etherate, which as liquids are easier to handle than gaseous boron halides.

Further, amines, nitrogen heterocycles, and guanidine derivatives are suitable in general for catalysis. An especially suitable catalyst from this group is 1,8-diazabicyclo [5.4.0]undec-7-ene (DBU).

Titanium, aluminum, and zirconium compounds, or mixtures of one or more catalysts from one or more of the just mentioned groups may also be used as catalysts.

Suitable as titanium catalysts are compounds that have hydroxy groups and/or substituted or unsubstituted alkoxy groups, therefore titanium alkoxides of the general formula

$Ti(OR^z)_4$, where $R^z$ is an organic group, preferably a substituted or unsubstituted hydrocarbon group having 1 to 20 C atoms, and the 4 alkoxy groups $—OR^z$ are identical or different. Further, one or more of the $—OR^z$ groups can be replaced by acyloxy groups $—OCOR^z$.

Likewise suitable as titanium catalysts are titanium alkoxides in which one or more alkoxy groups are replaced by a hydroxy group or halogen atoms.

Further, titanium chelate complexes can be used.

Aluminum catalysts can also be used as curing catalysts, e.g., aluminum alkoxides

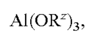

$Al(OR^z)_3$, where $R^z$ has the above meaning; i.e., it is an organic group, preferably a substituted or unsubstituted hydrocarbon group having 1 to 20 C atoms and the three $R^z$ groups are identical or different. In the case of aluminum alkoxides as well, one or more of the alkoxy groups can be replaced by acyloxy groups $—OC(O)R^z$.

Further, aluminum alkoxides can be used in which one or more alkoxy groups are replaced by a hydroxy group or halogen atoms.

Of the described aluminum catalysts, the pure aluminum alcoholates are preferred in regard to their stability to moisture and the curability of the mixtures to which they are added. In addition, aluminum chelate complexes are preferred.

Suitable as zirconium catalysts are, e.g.: tetramethoxyzirconium or tetraethoxyzirconium. Diisopropoxyzirconium bis(ethyl acetoacetate), triisopropoxyzirconium (ethyl acetoacetate), and isopropoxyzirconium tris(ethyl acetoacetate) are used with very particular preference. Further, zirconium acylates can be used, for example. Halogenated zirconium catalysts can also be used. Further, zirconium chelate complexes can also be used.

In addition, carboxylic acid salts of metals or also a mixture of a number of such salts can be employed as curing catalysts, whereby these are selected from the carboxylates of the following metals: calcium, vanadium, iron, zinc, titanium, potassium, barium, manganese, nickel, cobalt, and/or zirconium. Of the carboxylates, the calcium, vanadium, iron, zinc, titanium, potassium, barium, manganese, and zirconium carboxylates are preferred, because they exhibit a high activity. Calcium, vanadium, iron, zinc, titanium, and zirconium carboxylates are particularly preferred. Iron and titanium carboxylates are very particularly preferred.

The curable compositions contain the curing catalyst preferably in an amount of from about 0.05 to 2% by weight, preferably 0.1 to 1.5% by weight, based in each case on the total weight of the composition. If a mixture of different catalysts is used, the amounts refer to the total amount in the composition.

The compositions of the invention may comprise moisture curable polymers and may then crosslink in the presence of moisture and in so doing cure with the formation of Si—O—Si bonds.

The curable compositions can contain, apart from the components (A), (B) and optionally (C), one or more components that can be used to selectively influence specific properties of the curable composition and/or the cured product.

These other components can be selected, for example, from the group comprising plasticizers, stabilizers, antioxidants, fillers, reactive diluents, drying agents, adhesion promoters besides the compounds of formula (I), UV stabilizers, rheological aids, and/or solvents. Of particular importance are typically plasticizers, fillers, and stabilizers, comprising antioxidants and UV stabilizers.

Preferably, the curable compositions therefore contain at least one further component.

The composition described herein can contain in addition up to about 20% by weight of conventional adhesion promoters (tackifiers). Suitable as adhesion promoters are, for example, resins, terpene oligomers, coumarone/indene resins, aliphatic petrochemical resins, and modified phenol resins. Suitable within the context of the present invention are, for example, hydrocarbon resins, as can be obtained by polymerization of terpenes, primarily α- or β-pinene, dipentene, or limonene. These monomers are generally polymerized cationically with initiation using Friedel-Crafts catalysts. The terpene resins also include, for example, copolymers of terpenes and other monomers, for example, styrene, α-methylstyrene, isoprene, and the like. The aforesaid resins are used, for example, as adhesion promoters for contact adhesives and coating materials. Also suitable are terpene-phenol resins, which are prepared by the acid-catalyzed addition of phenols to terpenes or rosin. Terpene-phenol resins are soluble in most organic solvents and oils and miscible with other resins, waxes, and natural rubber. Also suitable as an additive in the aforesaid sense within the context of the present invention are the rosin resins and derivatives thereof, for example, the esters thereof.

Also suitable are silane adhesion promoters, particularly alkoxysilanes, with a (further) functional group such as, e.g., an amino group, a mercapto group, an epoxy group, a carboxyl group, a vinyl group, an isocyanate group, an isocyanurate group, or a halogen. Examples are γ-mercaptopropyltrimethoxysilane, γ-mercaptopropyltriethoxysilane, γ-mercaptopropylmethyldimethoxysilane, γ-glycidoxypropyltrimethoxysilane, γ-glycidoxypropyltriethoxysilane, γ-glycidoxypropylmethyldimethoxysilane, β-carboxyethyltriethoxysilane, β-carboxyethylphenylbis(2-methoxyethoxy)silane, N-β-(carboxymethyl)aminoethyl-γ-aminopropyltrimethoxysilane, vinyltrimethoxysilane, vinyltriethoxysilane, γ-acroyloxypropylmethyltriethoxysilane, γ-isocyanato-propyltrimethoxysilane, γ-isocyanatopropyltriethoxysilane, γ-isocyanatopropylmethyldiethoxysilane, γ-isocyanatopropylmethyldimethoxysilane, tris (trimethoxysilyl)isocyanurate, and γ-chloropropyltrimethoxysilane.

It is furthermore possible to include aminosilanes as adhesion promoters. Said aminosilanes may be selected from 3-aminopropyltrimethoxysilane, 3-aminopropyltriethoxysilane, aminomethyltrimethoxysilane, aminomethyltriethoxysilane, 3-aminopropylmethyldiethoxysilane, (N-2-aminoethyl)-3-aminopropyltrimethoxysilane, (N-2-aminoethyl)-3-aminopropyltriethoxysilane, diethylenetriaminopropyltrimethoxysilane, phenylaminomethyltrimethoxysilane, (N-2-aminoethyl)-3-aminopropylmethyldimethoxysilane, 3-(N-phenylamino)propyl-trimethoxysilane, 3-piperazinylpropylmethyldimethoxysilane, 3-(N,N-dimethylaminopropyl) aminopropylmethyldimethoxysilane, tri[(3-triethoxysilyl) propyl]amine, tri[(3-trimethoxysilyl)propyl]amine, and the oligomers thereof, 3-(N,N-dimethylamino)propyltrimethoxysilane, 3-(N,N-dimethylamino)-propyltriethoxysilane, (N,N-dimethylamino)methyltrimethoxysilane, (N,N-dimethylamino)methyltriethoxysilane, 3-(N,N-diethylamino) propyltrimethoxysilane, 3-(N,N-diethylamino)propyltriethoxysilane, (N,N-diethylamino)methyltrimethoxysilane, (N,N-diethylamino)methyltriethoxysilane, bis(3-trimethoxysilyl)propylamine, bis(3-triethoxysilyl)propylamine, 4-amino-3,3-dimethylbutyltrimethoxy silane, 4-amino-3,3-dimetylbutyltriethoxy silane, N-(n-butyl)-3-aminopropyltrimethoxysilane, and mixtures thereof, particularly preferably of 3-aminopropyltrimethoxysilane, 3-aminopropyltriethoxysilane, aminomethyltrimethoxysilane, aminomethyltriethoxysilane, 3-(N,N-dimethylamino) propyltrimethoxysilane, 3-(N,N-dimethylamino)propyltriethoxysilane, (N,N-dimethylamino)methyltrimethoxysilane, (N,N-dimethylamino)methyltriethoxysilane, 3-(N,N-diethylamino)propyltrimethoxysilane, 3-(N,N-diethylamino)propyltriethoxysilane, (N,N-diethylamino)methyltrimethoxysilane, (N,N-diethylamino)methyltriethoxysilane, bis(3-trimethoxysilyl)propylamine, and bis(3-triethoxysilyl) propylamine, 4-amino-3,3-dimethylbutyltrimethoxy silane, 4-amino-3,3-dimetylbutyltriethoxy silane, or N-(n-butyl)-3-aminopropyltrimethoxysilane, or oligomers obtained from the condensation of at least one of the above-mentioned aminosilanes, or mixtures thereof. The above-mentioned monomeric aminosilanes or oligomers can be oligomerized together with alkyl-, alkenyl- or aryl-alkoxysilanes, preferably methyltri(m)ethoxysilane, ethyltri(m)ethoxysilane, propyltri(m)ethoxysilane, vinyltri(m)ethoxysilane, n-butyltri(m)ethoxysilane, isobutyltri(m)ethoxysilane, phenyltri(m) ethoxysilane, and/or octyltri(m)ethoxysilane.

In various embodiments, the compositions of the invention further comprise at least one aminosilane as described above, in particular one of the tertiary aminosilanes. "Tertiary aminosilane", as used herein, refers to an aminosilane wherein the nitrogen atom of the amino group is covalently linked to three non-hydrogen residues.

It is conceivable that the viscosity of the curable composition is too high for certain applications. It can then be reduced in a simple and expedient way usually by using a reactive diluent, without any signs of demixing (e.g., plasticizer migration) occurring in the cured mass.

Preferably, the reactive diluent has at least one functional group which after application reacts, e.g., with moisture or atmospheric oxygen. Examples of groups of this type are silyl groups, isocyanate groups, vinylically unsaturated groups, and polyunsaturated systems.

All compounds that can be mixed with the other components with a reduction in viscosity and have at least one group reactive with the polymer can be used as reactive diluents.

The viscosity of the reactive diluent is preferably less than 20,000 mPas, particularly preferably about 0.1 to 6000 mPas, very particularly preferably 1 to 1000 mPas (Brookfield RVT, 23° C., spindle 7, 10 rpm).

The following substances, for example, can be used as reactive diluents: polyalkylene glycols reacted with isocyanatosilanes (e.g., Synalox 100-50B, DOW), carbamatopropyltrimethoxysilane, alkyltrimethoxysilane, alkyltriethoxysilane, such as methyltrimethoxysilane, methyltriethoxysilane, and vinyltrimethoxysilane (XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of said compounds.

Further, the following polymers from Kaneka Corp. can also be used as reactive diluents: MS S203H, MS S303H, MS SAT 010, and MS SAX 350.

Silane-modified polyethers which derive, e.g., from the reaction of isocyanatosilane with Synalox types can likewise be used.

Polymers that can be prepared from an organic framework by grafting with a vinylsilane or by reacting polyol, polyisocyanate, and alkoxysilane can be used, furthermore, as reactive diluents.

A polyol is understood to be a compound that may contain one or more OH groups in the molecule. The OH groups can be both primary and secondary.

Suitable aliphatic alcohols include, for example, ethylene glycol, propylene glycol, and higher glycols, as well as other polyfunctional alcohols. The polyols can contain in addition other functional groups such as. e.g., esters, carbonates, or amides.

To prepare the preferred reactive diluents, the corresponding polyol component is reacted in each case with an at least difunctional isocyanate. Any isocyanate having at least two isocyanate groups may basically be used as the at least difunctional isocyanate, but within the scope of the present invention, compounds with two to four isocyanate groups, particularly with two isocyanate groups, are generally preferred.

Preferably, the compound present as the reactive diluent has at least one alkoxysilyl group, whereby of the alkoxysilyl groups, the di- and trialkoxysilyl groups are preferred.

Suitable as polyisocyanates for the preparation of a reactive diluent are, for example, ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3 and −1,4 diisocyanate, bis(2-isocyanatoethyl) fumarate, as well as mixtures of two or more thereof, 1-isocyanato-3,3,5-trimethyl-5-isocyanatomethyl cyclohexane (isophorone diisocyanate, IPDI), 2,4- and 2,6-hexahydrotoluylene diisocyanate, hexahydro-1,3- or −1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), or the partially or completely hydrogenated cycloalkyl derivatives thereof, for example, completely hydrogenated MDI (H12-MDI), alkyl-substituted diphenylmethane diisocyanates, for example, mono-, di-, tri-, or tetraalkyl diphenylmethane diisocyanate and the partially or completely hydrogenated cycloalkyl derivatives thereof, 4,4'-diisocyanatophenyl perfluoroethane, phthalic acid bis-isocyanatoethyl ester, 1-chloromethylphenyl-2,4- or −2,6-diisocyanate, 1-bromomethylphenyl-2,4- or −2,6-diisocyanate, 3,3-bis-chloromethyl ether-4,4'-diphenyl diisocyanate, sulfur-containing diisocyanates, as can be obtained by reacting 2 mol of diisocyanate with 1 mol of thiodiglycol or dihydroxydihexyl sulfide, the di- and triisocyanates of dimer and trimer fatty acids, or mixtures of two or more of the aforesaid diisocyanates.

Trivalent or higher valent isocyanates, as can be obtained, for example, by oligomerization of diisocyanates, particularly by oligomerization of the aforesaid isocyanates, can also be used as polyisocyanates. Examples of such trivalent and higher-valent polyisocyanates are the triisocyanurates of HDI or IPDI or mixtures thereof or mixed triisocyanurates thereof, as well as polyphenylmethylene polyisocyanate, as can be obtained by phosgenation of aniline-formaldehyde condensation products.

Solvents and/or plasticizers can be used, in addition to or instead of a reactive diluent, for reducing the viscosity of the curable composition.

Suitable as solvents are aliphatic or aromatic hydrocarbons, halogenated hydrocarbons, ketones, ethers, esters, ester alcohols, keto alcohols, keto ethers, keto esters, and ether esters.

The composition described herein can furthermore contain hydrophilic plasticizers. These are used to improve the moisture absorption and thereby to improve the reactivity at low temperatures. Suitable as plasticizers are, for example, esters of abietic acid, adipic acid esters, azelaic acid esters, benzoic acid esters, butyric acid esters, acetic acid esters, esters of higher fatty acids having approximately 8 to approximately 44 carbon atoms, epoxidized fatty acids, fatty acid esters and fats, glycolic acid esters, phosphoric acid esters, phthalic acid esters, linear or branched alcohols containing 1 to 12 carbon atoms, propionic acid esters, sebacic acid esters, sulfonic acid esters, thiobutyric acid esters, trimellitic acid esters, citric acid esters, and esters based on nitrocellulose and polyvinyl acetate, as well as mixtures of two or more thereof.

For example, of the phthalic acid esters, dioctyl phthalate, dibutyl phthalate, diisoundecyl phthalate, or butylbenzyl phthalate is suitable, and of the adipates, dioctyl adipate, diisodecyl adipate, diisodecyl succinate, dibutyl sebacate, or butyl oleate.

Also suitable as plasticizers are the pure or mixed ethers of monofunctional, linear or branched $C_{4-16}$ alcohols or mixtures of two or more different ethers of such alcohols, for example, dioctyl ether (obtainable as Cetiol OE, Cognis Deutschland GmbH, Düsseldorf).

Endcapped polyethylene glycols are also suitable as plasticizers, for example, polyethylene or polypropylene glycol di-$C_{1-4}$-alkyl ethers, particularly the dimethyl or diethyl ethers of diethylene glycol or dipropylene glycol, and mixtures of two or more thereof.

Suitable plasticizers are endcapped polyethylene glycols, such as polyethylene or polypropylene glycol dialkyl ethers, where the alkyl group has up to four C atoms, and particularly the dimethyl and diethyl ethers of diethylene glycol and dipropylene glycol. An acceptable curing is achieved in particular with dimethyldiethylene glycol also under less favorable application conditions (low humidity, low temperature). Reference is made to the relevant technical chemistry literature for further details on plasticizers.

Also suitable as plasticizers are diurethanes, which can be prepared, for example, by reacting diols, having OH end groups, with monofunctional isocyanates, by selecting the stoichiometry such that substantially all free OH groups react. Optionally excess isocyanate can then be removed from the reaction mixture, for example, by distillation. A further method for preparing diurethanes consists of reacting monofunctional alcohols with diisocyanates, whereby all NCO groups are reacted if possible.

In various embodiments, the plasticizer may be a polydimethylsiloxane different from (A), particularly a PDMS that does not have terminal groups of formula (II).

In various embodiments, the curable composition comprises at least one plasticizer, for example a polydimethylsiloxane.

The curable compositions contain the plasticizer preferably in an amount of 1 to 50% by weight, preferably in an amount of 10 to 40% by weight, particularly preferably in an amount of 20 to 30% by weight, based in each case on the total weight of the composition. If a mixture of plasticizers is used, the amounts refer to the total amount of plasticizers in the composition.

Preferably, the curable composition contains at least one stabilizer, selected from antioxidants, UV stabilizers, and drying agents.

All conventional antioxidants may be used as antioxidants. They are preferably present up to about 7% by weight, particularly up to about 5% by weight.

The composition herein can contain UV stabilizers, which are preferably used up to about 2% by weight, preferably about 1% by weight. The so-called hindered amine light stabilizers (HALS) are particularly suitable as UV stabilizers. It is preferred within the context of the present invention if a UV stabilizer is employed, which carries a silyl group and is incorporated into the end product during crosslinking or curing. The products Lowilite 75 and Lowilite 77 (Great Lakes, USA) are particularly suitable for this purpose. Further, benzotriazoles, benzophenones, benzoates, cyanoacrylates, acrylates, sterically hindered phenols, phosphorus, and/or sulfur can also be added.

It is often useful to stabilize the compositions in regard to penetrating moisture by means of drying agents in order to increase the storability (shelf life) still further.

Such an improvement in storability can be achieved, for example, by using drying agents. All compounds that react with water with the formation of a group inert to the reactive groups present in the preparation are suitable as drying agents and thereby undergo the smallest possible changes in their molecular weight. Furthermore, the reactivity of the drying agents to moisture penetrating into the preparation must be higher than the reactivity of the groups of the silyl group-bearing polymer of the invention present in the preparation.

Isocyanates, for example, are suitable as drying agents.

Advantageously, however, silanes are used as drying agents. For example, vinylsilanes such as 3-vinylpropyltriethoxysilane, oxime silanes such as methyl-O,O',O''-butan-2-one-trioximosilane or O,O',O'',O'''-butan-2-one-tetraoximosilane (CAS Nos. 022984-54-9 and 034206-40-1) or benzamidosilanes such as bis(N-methylbenzamido)methylethoxysilane (CAS No. 16230-35-6) or carbamatosilanes such as carbamatomethyltrimethoxysilane. The use of methyl-, ethyl-, or vinyltrimethoxysilane, tetramethyl- or tetraethylethoxysilane is also possible. Vinyltrimethoxysilane and tetraethoxysilane are particularly suitable in terms of cost and efficiency.

Also, suitable as drying agents are the aforesaid reactive diluents, provided they have a molecular weight (Mn) of less than about 5000 g/mol and have end groups whose reactivity to penetrated moisture is at least as high as, preferably higher than, the reactivity of the reactive groups of the polymer used according to the invention.

Lastly, alkyl orthoformates or alkyl orthoacetates can also be used as drying agents, for example, methyl or ethyl orthoformate or methyl or ethyl orthoacetate.

The compositions generally contain about 0 to about 6% by weight of drying agent.

The composition described herein can additionally contain fillers. Suitable here are, for example, chalk, lime powder, precipitated and/or pyrogenic (fumed) silica, zeolites, bentonites, magnesium carbonate, diatomaceous earth, alumina, clay, tallow, titanium oxide, iron oxide, zinc oxide, sand, quartz, flint, mica, glass powder, and other ground mineral substances. Organic fillers can also be used, such as, for example, carbon black, graphite, wood fibers, wood flour, sawdust, cellulose, cotton, pulp, cotton, wood chips, chopped straw, and chaff. Short fibers such as glass fibers, glass filament, polyacrylonitrile, carbon fibers, Kevlar fibers, or polyethylene fibers may also be added. Aluminum powder is also suitable as a filler.

The pyrogenic (fumed) and/or precipitated silica preferably have a BET surface area of 10 to 90 $m^2/g$. When they are used, they do not cause any additional increase in the viscosity of the composition of the invention but contribute to strengthening the cured composition.

It is likewise conceivable to use pyrogenic and/or precipitated silica with a higher BET surface area, advantageously with 100 to 250 $m^2/g$, particularly 110 to 170 $m^2/g$, as a filler. Because of the higher BET surface area, the same effect, e.g., strengthening of the cured preparation, can be achieved at a smaller weight proportion of silicic acid. Further substances can thus be used to improve the composition described herein in terms of other requirements.

Suitable further as fillers are hollow spheres having a mineral shell or a plastic shell. These can be, for example, hollow glass spheres which are obtainable commercially under the trade names Glass Bubbles®. Plastic-based hollow spheres, e.g., Expancel® or Dualite®, are described, for example, in EP 0 520 426 B1. They are made up of inorganic or organic substances and each have a diameter of 1 mm or less, preferably 500 μm or less.

Fillers that impart thixotropy to the preparations are preferred for many applications. Such fillers are also described as rheological adjuvants, e.g., hydrogenated castor oil, fatty acid amides, or swellable plastics such as PVC. In order to be readily squeezable out of a suitable dispensing device (e.g., a tube), such preparations possess a viscosity from 3000 to 15,000, preferably 40,000 to 80,000 mPas, or even 50,000 to 60,000 mPas.

The fillers are preferably used in an amount of 1 to 80% by weight, particularly preferably 2 to 20% by weight, and very particularly preferably 5 to 10% by weight, based in each case on the total weight of the composition. Of course, mixtures of a number of fillers can also be used. In this case, the quantitative data naturally refer to the total amount of filler in the composition.

While the compositions of the invention have been described herein in particular with reference to silicone polymers and SMPs, especially polysiloxanes, it is understood that the invention also encompasses compositions with other types of curable polymers. It is understood that for such compositions the additional (optional) components may be adapted or replaced, with such modification and selection being well within the routine capabilities of the skilled practitioner in the field.

The preparation of the curable composition can take place by simple mixing of the polymer (A), the capped adhesion promoter (B), the optional catalyst (C), and optionally the other ingredients. This can take place in suitable dispersing units, e.g., a high-speed mixer. In this case, preferably, care is taken that the mixture does not come into contact with moisture as far as possible, which could lead to an undesirable premature curing. Suitable measures are sufficiently known and comprise, for example, working in an inert atmosphere, possibly under a protective gas, and drying/heating of individual components before they are added.

The compositions of the invention can be used as an adhesive or sealing or coating material.

The composition can be used, for example, as an adhesive, sealant, coating, and for the production of molded parts. A further field of application for the compositions is the use as a plugging compound, hole filler, or crack filler.

The compositions are suitable, inter alia, for bonding plastics, metals, glass, ceramic, wood, wood-based materials, paper, paper-based materials, rubber, and textiles, for gluing floors, and for sealing building elements, windows, wall and floor coverings, and joints in general. In this case, the materials can be bonded to themselves or as desired to one another.

The following examples serve to explain the invention, but the invention is not limited thereto.

EXAMPLES

Preparation of the Silane Compound According to the Invention

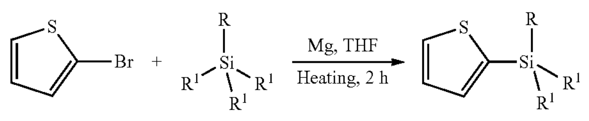

A three-neck round-bottom flask equipped with cooling condenser, dropping funnel, magnetic stir bar and a stopper is charged with magnesium chips (150 mmol, 1.5 eq, 3.6465 g) and flame-dried under reduced pressure. A crystal of iodine is added and sublimed by heating, etching the surface of the magnesium. Tetrahydrofuran (150 ml), followed by a silane of the formula shown in the scheme above, wherein R and R1 are as defined in Table 1 below, is added to the flask (150 mmol, 1.5 eq). The stopper is swapped for a thermometer. To the dropping funnel 2-bromothiophene (100 mmol, 1 eq) is added. While stirring, 10 vol % 2-bromothiophene is added to the flask in one portion. An increase in temperature is observed. Dropping is continued while maintaining a temperature between 40° C. and 50° C. After the addition heating to 60° C. is turned on for 2 h. The tetrahydrofuran is distilled off, leaving a wet grey solid. Hexane (150 ml) is added to the flask and the solid is suspended, turning the color from grey to white. The solids are filtered, and hexane is distilled off yielding a crude product. Clean product is obtained by the means of vacuum distillation at 1.0×10−3 mbar. The obtained silane compound has the above-shown general formula, wherein R1 and R are as defined in Table 1.

TABLE 1

| Synthesized silane compounds | | |
|---|---|---|
| Compound | R | $R^1$ |
| TMTS | methoxy | methoxy |
| TETS | ethoxy | ethoxy |
| VDMTS | vinyl | methoxy |

Example 1: Alkoxysilane Formulations

TABLE 2

| (all amounts in % by weight) | | | |
|---|---|---|---|
| Compound | Ex. 1 | Ex. 2 (comparative) | Ex. 3 (comparative) |
| VTEO Polymer | 67 | 67 | 67 |
| WM1000 | 21.8 | 21.8 | 21.8 |
| Aerosil R 104 | 10 | 10 | 10 |
| TETS | 1 | | |
| AMEO | | 1 | |
| VTEO | | | 1 |
| DOTL | 0.2 | 0.2 | 0.2 |

WM1000 = Plasticizer (Polydimethylsiloxane with a viscosity of 1,000 cST);
Aerosil R 104 = Filler;
TETS = Triethoxy(thiophen-2-yl)silane (Table 1);
AMEO = 3-Aminopropyltriethoxysilane;
DOTL = tin catalyst VTEO polymer was obtained as follows: a mixture of 100 g α,ω-dihydroxy-terminated polydimethylsiloxane (Mw: 107,000), 6.3 g vinyltriethoxysilane (VTEO) and 0.33 g K Kat 670 (zinc complex catalyst from King) was stirred for 1 min with 2200 rpm at RT.

Only the formulation of example 1 was curable, while formulations of examples 2 and 3 did not cure.

Example 2: Lactate Silicone Formulations

TABLE 3

| (all amounts in % by weight) | | | | | |
|---|---|---|---|---|---|
| Compound | Ref. | Ex. 4 | Ex. 5 | Ex. 6 (comparative) | Ex. 7 (comparative) |
| Lactate polymer composition | 100 | 99 | 99 | 99 | 99 |
| VDMTS | | 1 | | | |
| TETS | | | 1 | | |
| Geniosil XL12 | | | | 1 | |
| Silan M1 | | | | | 1 |

The lactate polymer was produced from the following components:

51.77 w % α,ω-dihydroxy-terminated polydimethylsiloxane with a viscosity of 80,000 cST
27.10 w % Mixture of PDMS plasticizers (1,000 cST and 100,000 cST PDMS plasticizers)
4.44 w % Dearomatized aliphatic fluids—Extender
5 w % Vinyl tris(ethyl lactato)silane
8.88 w % Highly dispersed silica
0.9 w % 3-Aminopropyltrimethoxysilane
0.75 w % 3-(N,N-dimethylamino)propyltrimethoxysilane
0.17 w % DOTL (dioctyltin dilaurate)

VDMTS and TETS are compounds shown in Table 1. Geniosil XL12 is Methylvinyldimethoxysilane (Wacker) and Silan M1 is Methyltriethoxysilane (Wacker). Both are used as comparative examples. Adhesion properties of all formulations on different surfaces were determined. The results are shown in Table 4.

TABLE 4

| Adhesion after 7 days | | | | | |
|---|---|---|---|---|---|
| Surface | Ref. | Ex. 4 | Ex. 5 | Ex. 6 (comparative) | Ex. 7 (comparative) |
| Aluminum anodized | Af3 | Af2 | cf | Af3 | Af3 |
| Aluminum blank | Af3 | cf | cf | Af3 | Af3 |
| PMMA | Af3 | Af3 | Af3 | Af3 | Af3 |
| Glass | cf | cf | cf | cf | cf |
| Concrete | Af3 | Af2 | Af2 | Af3 | Af3 |

Cf = cohesive failure;
Af = adhesive failure (rated from 1 (best) to 3 (worst));
PMMA = poly(methylmethacrylate)

The formulations according to the invention (formulations 4 and 5) showed significant improvement of adhesion on aluminum surfaces and slight improvement on concrete surfaces. On plastic (PMMA) no difference was observed.

TABLE 5

| (all amounts in % by weight) | | | | | | |
|---|---|---|---|---|---|---|
| Compound | Ref. | Ex. 8 | Ex. 9 | Ex. 10 | Ex. 11 (comparative) | Ex. 12 (comparative) |
| OH-terminated PDMS (viscosity 80.000 cST) | 52.4 | 52.4 | 52.4 | 52.4 | 52.4 | 52.4 |
| Plasticizer (OH-terminated PDMS; viscosity 1.000 cST) | 33.6 | 28.6 | 28.6 | 28.6 | 28.6 | 28.6 |
| LT20 | 5.0 | 5.0 | 5.0 | 5.0 | 5.0 | 5.0 |
| Highly dispersed silica | 7.4 | 7.4 | 7.4 | 7.4 | 7.4 | 7.4 |
| DMAPTMS | 0.5 | 0.5 | 0.5 | 0.5 | 0.5 | 0.5 |
| AMMO | 0.9 | 0.9 | 0.9 | 0.9 | 0.9 | 0.9 |
| TMTS | | 5.0 | | | | |
| TETS | | | 5.0 | 10.0 | | |
| Bis-PhTMO | | | | | 5.0 | 10.0 |
| DOTL | 0.2 | 0.2 | 0.2 | 0.2 | 0.2 | 0.2 |

LT20 = Vinyl-tris(ethyllactate)silane;
Aerosil R974 = Filler;
DMAPTMS = N,N-Dimethlyaminopropyl trimethoxy silane;
AMMO = 3-Aminopropyltrimethoxysilane;
TMTS = Triethoxy(thiophen-2-yl)silane (Table 1);
TETS = triethoxy(thiophen-2-yl)silane (Table 1);
Bis-PhTMO = bis(phenyltrimethoxysilane);
DOTL = dioctyltin dilaurate All examples (Example 8-12) showed comparable skin over times, cure through and hardness, but differed in the mechanical properties of the cured formulation (tensile strength and elongation), as shown in the Table 6 below.

Specifically, the inventive examples comprising TMTS and TETS showed better properties than those with Bis-PhTMO and the reference.

TABLE 6

| Properties | Ref. | Ex. 8 | Ex. 9 | Ex. 10 | Ex. 11 (comparative) | Ex. 12 (comparative) |
|---|---|---|---|---|---|---|
| SOT [Min] | 15 | 10 | 15 | 20 | 25 | 60 |
| Cure through mm/24 h | 3.1 | 2.1 | 2.6 | 2.4 | 2.1 | 1.8 |
| Shore A 7 days | 23.2 | 32.2 | 29.2 | 32.2 | 25.2 | 33.6 |
| Elongation at break [%] | 483 | 472 | 399 | 418 | 406 | 388 |
| Modulus at 100% elongation [N/mm$^2$] | 0.41 | 0.63 | 0.57 | 0.84 | 0.45 | 0.66 |
| Tensile strength at break [N/mm$^2$] | 1.26 | 2.21 | 1.56 | 2.54 | 1.34 | 2.07 |

Example 3: SMP Formulations

TABLE 7

(all amounts in % by weight)

| Compound | Ref. | Ex. 13 | Ex. 14 | Ex. 15 |
|---|---|---|---|---|
| Prepolymer | 79.00 | 69.00 | 59.00 | 49.00 |
| Wacker HDK H20 | 15.00 | 15.00 | 15.00 | 15.00 |
| 3-Aminopropyltrimethoxysilane AMMO | 1.60 | 1.60 | 1.60 | 1.60 |
| 3-Methacryloxypropyl-trimethoxysilane MEMO | 14.00 | 4.00 | 4.00 | 4.00 |
| Triethoxy(thiophen-2-yl) silane | | 10.00 | 20.00 | 30.00 |
| DOTL | 0.40 | 0.40 | 0.40 | 0.40 |

Prepolymer was prepared by the following procedure: 282 g (15 mmol) polypropylene glycol 18000 (hydroxyl value=6.0) was dried in a 500 ml three-neck flask at 80-90° C. under vacuum. Under a nitrogen atmosphere at 80° C., 0.1 g of dibutyltin laurate was added, and 7.2 g (32 mmol) 3-isocyanatopropyltrimethoxysilane (% NCO=18.4) was then added to it. After stirring for one hour at 80° C., the resulting polymer was cooled. After adding 3 g light stabilizer (Tinuvin 770 DF) and 6 g Geniosil XL 10 to the reactor while stirring and homogenizing for 10-30 minutes at 80° C., the resulting polymer was stored in a moisture-proof glass vessel under a nitrogen atmosphere before being processed further into a curable composition.

The formulations of Examples 13, 14 and 15 showed good mechanical properties as shown in Table 8 below.

TABLE 8

| Properties | Ref. | Ex. 13 | Ex. 14 | Ex. 15 |
|---|---|---|---|---|
| SOT [Min] | 5 | 10 | 10 | 10 |
| Cure through mm/24 h | 2.8 | 3.1 | 3.4 | 2.8 |
| Shore A 7 days | 58.4 | 69.4 | 67.2 | 73.2 |
| Elongation at break [%] | 161 | 306 | 667 | 816 |
| Modulus at 100% elongation [N/mm$^2$] | 2.68 | 2.92 | 2.76 | 2.86 |
| Tensile strength at break [N/mm$^2$] | 3.83 | 7.05 | 14.20 | 14.90 |

The invention claimed is:

1. A curable composition comprising (A) at least one curable polymer;

(B) at least one silane compound of general formula (I) containing at least one heteroatom bridged to a silicon atom via a $sp^2$-hybridized quaternary carbon atom

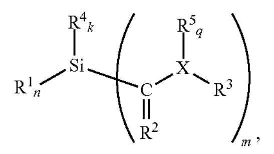

(I)

wherein n is 1, 2 or 3;

m is 1 or 2;

k is 0 or 1, wherein the sum of n, m, and k is 4; and q is an integer selected from 0 to 3;

each $R^1$ is independently selected from a hydrolyzable group, each $R^4$ is independently selected from hydrogen or a linear or branched, substituted or unsubstituted hydrocarbon group having 1 to 20 carbon atoms which optionally contain at least one heteroatom;

X is a divalent or polyvalent heteroatom;

each $R^5$ is independently hydrogen, or a linear or branched, substituted or unsubstituted hydrocarbon group having 1 to 20 carbon atoms which optionally contain at least one heteroatom;

$R^2$ is a linear or branched, substituted or unsubstituted hydrocarbon group having 1 to 20 carbon atoms which optionally contain at least one heteroatom, $R^3$ is hydrogen or a linear or branched, substituted or unsubstituted hydrocarbon group having 1 to 20 carbon atoms which optionally contain at least one heteroatom, or $R^2$ and $R^3$ combine to form a cyclic structure;

and (C) optionally at least one curing catalyst.

2. The curable composition of claim 1, wherein the at least one curable polymer (A) is a moisture-curable polymer, selected from the group consisting of silane-modified polymers and silicones.

3. The curable composition of claim 2, wherein the at least one curable polymer (A) comprises a polyorganosiloxane.

4. The curable composition according to claim 3, wherein the curable polymer (A) comprises at least one terminal group of general formula (II):

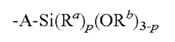

(II)

wherein:

p is 0, 1 or 2;

A is a bond, —O—, or a linear, branched or cyclic divalent group, wherein the linear, branched, or cyclic divalent group is selected from the group consisting of a hydrocarbon residue having 1 to 12 carbon atoms, alkylene, arylene, oxyalkylene, oxyarylene, siloxane-alkylene, siloxane-arylene, ester, amine, glycol, imide, amide, alcohol, carbonate, urethane, urea, sulfide, ether, and a combination thereof;

each $R^a$ is independently selected from the group consisting of hydrogen, halogen, amino, oximino, a substituted or unsubstituted alkyl, alkenyl, alkenyloxy, alkynyl, alkylnyloxy, cycloaliphatic, cycloaliphatic-O—, aryl, aryloxy, heteroaryl, heteroaryloxy, heteroalicyclic, heteroalicyclicoxy, acyl, acyloxy group, and a combination thereof;

each $R^b$ is independently H, $C_1$-$C_8$ alkyl, $C_1$-$C_8$ acyl, a group of general formula (IIIa) or a group of general formula (IIIb):

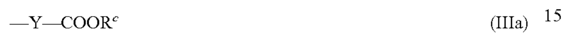

—Y—COOR$^c$ (IIIa)

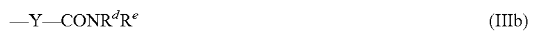

—Y—CONR$^d$R$^e$ (IIIb)

wherein

Y is a substituted or unsubstituted (hetero) aromatic group having 4 to 14 ring atoms, a substituted or unsubstituted saturated or partially unsaturated 4- to 14-membered (hetero)cyclic group or —$(C(R^f)_2)_s$—;

$R^c$ is a substituted or unsubstituted alkyl, alkenyl, alkynyl, cycloaliphatic, aryl, heteroaryl, heteroalicyclic group or a combination thereof;

each $R^f$ is independently selected from the group consisting of hydrogen, a substituted or unsubstituted alkyl, alkenyl, alkynyl, cycloaliphatic and aryl group; and s is an integer from 1 to 10;

$R^d$ is selected from the group consisting of hydrogen, a substituted or unsubstituted alkyl, alkenyl, alkynyl cycloaliphatic, aryl, heteroaryl, and heteroalicyclic group and a combination thereof and $R^e$; where $R^e$ is a group of general formula (IV):

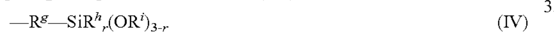

—$R^g$—$SiR^h{}_r(OR^i)_{3-r}$ (IV)

wherein $R^g$ is an alkylene group, optionally interrupted by a heteroatom;

each $R^h$ is independently selected from the group consisting of hydrogen, halogen, amino, a substituted or unsubstituted alkyl, alkenyl, alkynyl, cycloaliphatic, aryl, heteroaryl, a heteroalicyclic group and a combination thereof;

each $R^i$ is independently a substituted or unsubstituted alkyl, alkenyl, alkynyl, or acyl group; and each r independently represents 0, 1, or 2.

5. The curable composition of claim 4, wherein (i) each $R^b$ is independently H, $C_1$-$C_2$ alkyl, $C_2$ acyl or a group of the general formula (IIIa); and/or (ii) p is 0 or 1 and each $R^b$ is independently acetyl, ethyl, methyl or a group of the general formula (IIIa), wherein $R^c$ stands for a substituted or unsubstituted alkyl group having 1 to 10 carbon atoms; and Y is a substituted or unsubstituted aromatic group having 6 carbon ring atoms, 1,2-phenylene, or —$(C(R^f)_2)_s$—, wherein s is 1 and a first $R^f$ group is hydrogen and a second $R^f$ group is a substituted or unsubstituted alkyl group having 1 to 10 carbon atoms; the group of formula (IIIa) is selected from the group consisting of a lactic acid ester group, an ethyl ester group, a malic acid mono-ester group and a malic acid di-ester group.

6. The curable composition according to claim 5, wherein A is a bond, —O— or a linear or branched divalent group selected from a siloxane-alkylene of formula: —$(CH_2)_{1-10}$—$(Si(Alk)_2$-O—$Si(Alk)_2)_{1-10}$—$(CH_2)_{1-10}$, with Alk being unsubstituted $C_{1-10}$ alkyl.

7. The curable composition according to claim 1, wherein the silane compound (B) has the general formula (I-A)

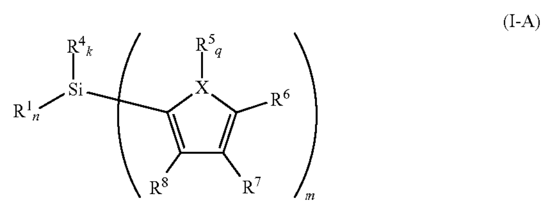

(I-A)

wherein $R^1$, $R^4$, $R^5$, X, n, m, k, and q are as defined for said general formula (I);

$R^6$, $R^7$, and $R^8$ are same or different, independently from one another, selected from a hydrogen, a hydroxy group, and a linear or branched, substituted or unsubstituted hydrocarbon group having 1 to 20 carbon atoms which optionally contain at least one heteroatom.

8. The curable composition according to claim 1, wherein (i) each $R^1$ is independently selected from the group consisting of alkoxy, carboxy, oxime, amino, amido, lactato, alkenoxy, and acetoxy groups; and/or (ii) each $R^4$ is independently selected from hydrogen, $C_1$ to $C_{20}$ alkyl, $C_2$ to $C_{20}$ alkenyl, $C_5$ to $C_{20}$ aryl, $C_7$ to $C_{20}$ alkaryl, and $C_7$ to $C_{20}$ aralkyl groups which optionally contain at least one heteroatom, selected from O, N, S, P, Si, Cl, Br, I or F.

9. The curable composition according to claim 1, wherein each $R^4$ is independently selected from the group consisting of hydrogen, $C_1$ to $C_{12}$ alkyl, $C_2$ to $C_{12}$ alkenyl, $C_5$ to $C_{12}$ aryl group, $C_2$ to $C_{12}$ alkenyl, and $C_5$ to $C_{12}$ aryl groups which contain at least one heteroatom.

10. The curable composition according to claim 1, wherein X is selected from O, S, N and P; and/or wherein each $R^4$ is independently selected from the group consisting of hydrogen, ethyl, n-propyl, isopropyl, trifluoropropyl, aminopropyl, n-butyl, sec-butyl, tert-butyl, vinyl, phenyl, and a pyridinyl group.

11. The curable composition according to claim 7, wherein $R^6$, $R^7$ and $R^8$ are the same or different, independently from one another, selected from the group consisting of a hydrogen, $C_1$ to $C_{20}$ alkyl, $C_4$ to $C_8$ cycloalkyl and $C_5$ to $C_{20}$ aryl groups which optionally contain at least one heteroatom.

12. The curable composition according to claim 11, wherein n is 2 or 3, and/or m is 1, and $R^6$, $R^7$ and $R^8$ are hydrogen.

13. The curable composition according to claim 1, wherein the at least one curing catalyst (C) is an organotin compound selected from 1,3-dicarbonyl compounds of bivalent or tetravalent tin, dialyltin(IV) dicarboxylates, dialkyltin(IV) dialkoxylates, dialkyltin(IV) oxides, tin(II) carboxylates, and mixtures thereof.

14. The curable composition according to claim 1, further comprising one or more additional ingredients selected from the group consisting of plasticizers, fillers, bases, and adhesion promoters different from (B).

15. An adhesive, sealing, or coating material comprising the composition according to claim 1.

16. A method of sealing, coating or bonding a substrate comprising steps of: applying the adhesive, sealing, or coating material according to claim 15 to at least one surface of the substrate and curing said material.

17. The curable composition of claim 3, wherein the polyorganosiloxane comprises a polydiorganosiloxane.

18. The curable composition of claim 17, wherein the polydiorganosiloxane comprises a polydimethylsiloxane (PDMS).

* * * * *